(12) United States Patent
Ishigami et al.

(10) Patent No.: US 9,463,740 B2
(45) Date of Patent: Oct. 11, 2016

(54) INFORMATION PRESENTATION DEVICE, AND METHOD FOR CONTROLLING INFORMATION PRESENTATION DEVICE

(71) Applicant: Panasonic Corporation, Osaka (JP)

(72) Inventors: Tomohide Ishigami, Osaka (JP); Toshiya Arai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 104 days.

(21) Appl. No.: 14/117,645

(22) PCT Filed: Apr. 18, 2013

(86) PCT No.: PCT/JP2013/002632
§ 371 (c)(1),
(2) Date: Nov. 14, 2013

(87) PCT Pub. No.: WO2013/186973
PCT Pub. Date: Dec. 19, 2013

(65) Prior Publication Data
US 2015/0145659 A1 May 28, 2015

(30) Foreign Application Priority Data

Jun. 11, 2012 (JP) .................................. 2012-132220

(51) Int. Cl.
*B60Q 1/00* (2006.01)
*B60Q 9/00* (2006.01)
*B60R 16/02* (2006.01)
*B62D 15/02* (2006.01)
(Continued)

(52) U.S. Cl.
CPC ............... *B60Q 9/008* (2013.01); *B60R 16/02* (2013.01); *B62D 15/029* (2013.01); *B60N 2002/4485* (2013.01); *G08B 6/00* (2013.01); *G08G 1/167* (2013.01)

(58) Field of Classification Search
None
See application file for complete search history.

(56) References Cited

U.S. PATENT DOCUMENTS 8,412,390 B2    4/2013  Sanma et al.
2005/0258977 A1*  11/2005  Kiefer et al. ................. 340/903
(Continued)

FOREIGN PATENT DOCUMENTS

JP    2005-088717    4/2005
JP    2005-280436    10/2005
(Continued)

OTHER PUBLICATIONS

International Search Report issued Jun. 4, 2013 in International (PCT) Application No. PCT/JP2013/002632.

*Primary Examiner* — Travis Hunnings
(74) *Attorney, Agent, or Firm* — Wenderoth, Lind & Ponack, L.L.P.

(57) ABSTRACT

An information presentation device includes: an obtainment unit which obtains position information indicating a position of a nearby object with respect to a user; a stimulation presentation unit which contacts the user through a contact surface and provides stimulation in a stimulation region within the contact surface; and a stimulation control unit which (i) determines a reference position, which is a position within the contact surface, corresponding to the position information and (ii) performs control for causing the stimulation presentation unit to provide the user with stimulation while changing the stimulation region with reference to the reference position.

15 Claims, 15 Drawing Sheets

(51) Int. Cl.
*G08G 1/16* (2006.01)
*G08B 6/00* (2006.01)
*B60N 2/44* (2006.01)

(56) References Cited

U.S. PATENT DOCUMENTS

| | | | | |
|---|---|---|---|---|
| 2006/0255920 | A1* | 11/2006 | Maeda et al. | 340/407.1 |
| 2007/0109104 | A1* | 5/2007 | Altan et al. | 340/407.1 |
| 2007/0182527 | A1* | 8/2007 | Traylor | B60Q 9/008 340/435 |
| 2009/0015045 | A1* | 1/2009 | Nathan et al. | 297/217.3 |
| 2010/0260382 | A1* | 10/2010 | Burtch | B60T 7/22 382/106 |
| 2011/0001616 | A1* | 1/2011 | Nathan et al. | 340/438 |
| 2011/0035100 | A1* | 2/2011 | Sanma et al. | 701/36 |
| 2011/0163862 | A1* | 7/2011 | Nath | G08G 1/164 340/432 |
| 2012/0126965 | A1* | 5/2012 | Sanma et al. | 340/438 |
| 2012/0293314 | A1* | 11/2012 | Chatterjee et al. | 340/436 |
| 2014/0118130 | A1* | 5/2014 | Chang et al. | 340/435 |

FOREIGN PATENT DOCUMENTS

| | | |
|---|---|---|
| JP | 2006-199094 | 8/2006 |
| JP | 2006-215900 | 8/2006 |
| JP | 2006-341839 | 12/2006 |
| JP | 2008-077631 | 4/2008 |
| JP | 2011-37305 | 2/2011 |
| JP | 2011-048566 | 3/2011 |
| JP | 4650720 | 3/2011 |

* cited by examiner

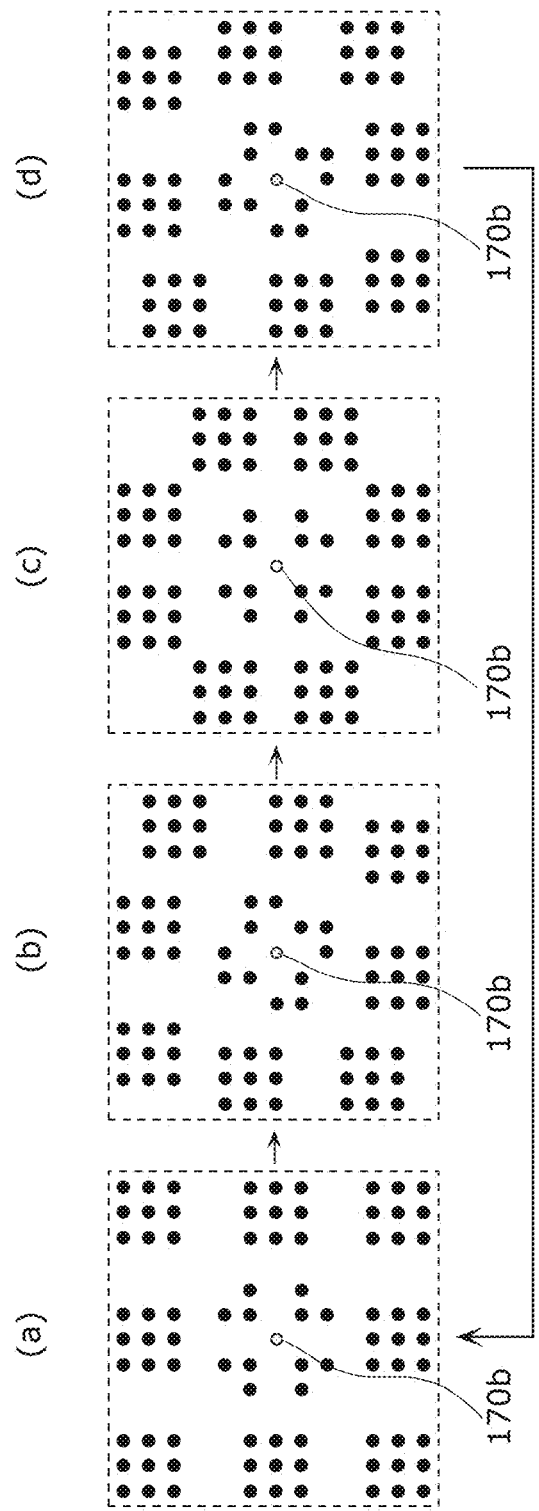

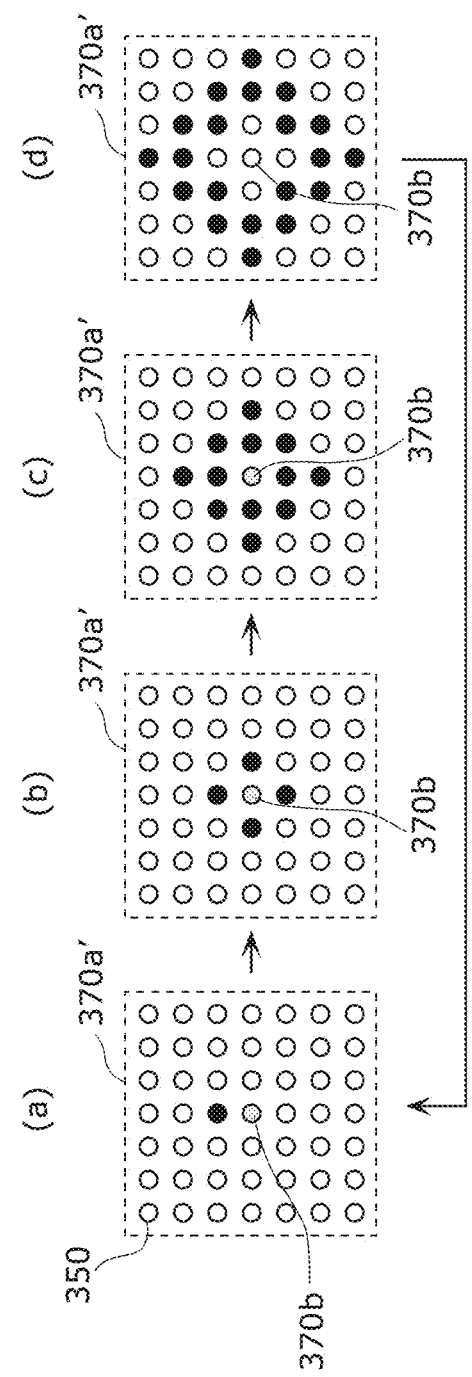

INFORMATION PRESENTATION DEVICE, AND METHOD FOR CONTROLLING INFORMATION PRESENTATION DEVICE

TECHNICAL FIELD

The present invention relates to an information presentation device which presents information to a user by providing stimulation perceived through a tactile sensation.

BACKGROUND ART

Conventionally, techniques are available which allow a user to perceive a position of a nearby object using a device (hereinafter also referred to as a tactile sensation display) which provides a user with stimulation through a tactile sensation. The tactile sensation display is provided, for example, on a seat or a steering wheel of an automobile to indicate the user a position of a nearby object which is outside the line of sight (e.g., see patent literature (PTL) 1, 2, and 3).

CITATION LIST

Patent Literature

[PTL 1]
Japanese Unexamined Patent Application Publication No. 2006-199094
[PTL 2]
Japanese Patent No. 4650720
[PTL 3]
Japanese Unexamined Patent Application Publication No. 2011-37305

SUMMARY OF INVENTION

Technical Problem

However, with techniques in PTL 1, 2, and 3, stimulation provided to a user to indicate a position of a nearby object is generally weak. In particular, a user has difficulty in clearly perceiving the position of a nearby object when a change in position of the nearby object with respect to the user is small.

Solution to Problem

In order to solve the above problems, an information presentation device according to an aspect of the present invention is an information presentation device which provides a user with stimulation corresponding to a feature of a nearby object around the user, the information presentation device including: an obtainment unit configured to obtain information indicating the feature of the nearby object; a stimulation presentation unit which contacts the user through a contact surface and is configured to provide the user with the stimulation in a stimulation region within the contact surface; and a stimulation control unit configured to (i) determine, based on the information indicating the feature of the nearby object, a reference position within the contact surface, and (ii) perform control for causing the stimulation presentation unit to provide the stimulation while changing the stimulation region with reference to the reference position.

It should be note that these general and specific aspects may be implemented using a system, a method, an integrated circuit, a computer program, a computer-readable recording medium, such as a CD-ROM, or any combination of systems, methods, integrated circuits, computer programs and recording media.

Advantageous Effects of Invention

An information presentation device according to the present invention makes it possible for a user to dearly perceive a feature of a nearby object, in particular the position of the nearby object, through a tactile sensation, even when a change in position of the nearby object with respect to the user is small.

DESCRIPTION OF EMBODIMENTS

Figure 1:
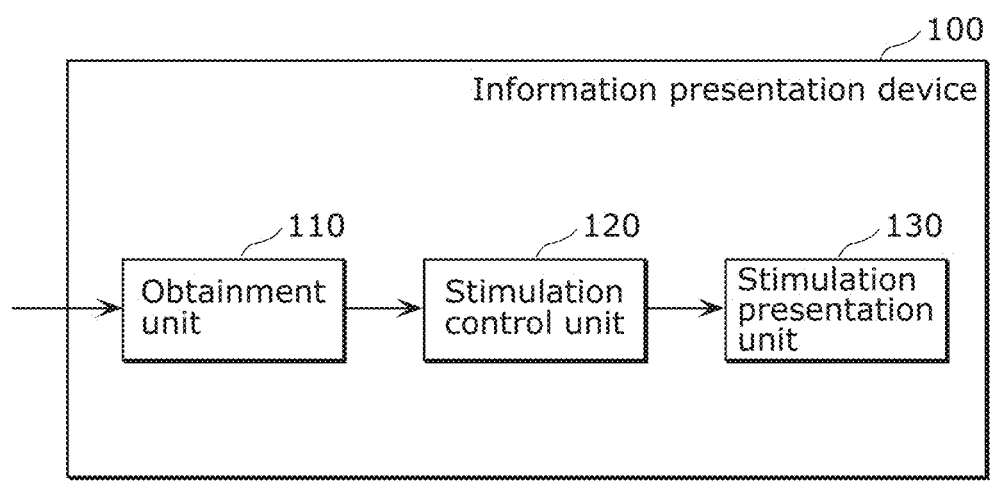
FIG. 1 is a block diagram showing a system configuration of an information presentation device according to Embodiment 1.

Underlying Knowledge Forming Basis of the Present Invention

As described in the "Background Art", a technique is anticipated which makes it possible for a user to clearly perceive the position of a nearby object even when a change in position of the nearby object with respect to the user is small.

For example, a technique according to PTL 1 provides a steering wheel of an automobile with a plurality of tactile sensation devices for providing stimulation to a user, by turning on or off adjacent tactile sensation devices corresponding to the position of a nearby object. With the technique according to PTL 1, the stimulation given to a user is sometimes weak, depending on the position of a hand of a user gripping the steering wheel.

Furthermore, a technique according to PTL 2 arranges vibrators in a grid on a seating surface and back of a seat of an automobile to provide a user with vibration through a vibrator on the seat which corresponds to the position of a nearby object. When a change in position of the nearby object with respect to a user is small, the user perceives stimulation from the same position. This decreases the sensitivity of the user to stimulation, sometimes causing the cases in which the user cannot feel sufficient stimulation.

Furthermore, a technique described in PTL 3 controls the stimulus strength of two vibrators provided on a steering wheel of an automobile, and thereby providing a user, who is gripping a portion between the two vibrators on the steering wheel, with stimulation corresponding to the position of a nearby object. The technique in PTL 3 has a problem that the stimulation provided to a user is weak because the user grips a portion between the vibrators.

In order to solve the above problems, an information presentation device according to an aspect of the present invention is an information presentation device which provides a user with stimulation corresponding to a feature of a nearby object around the user, the information presentation device including: an obtainment unit configured to obtain information indicating the feature of the nearby object; a stimulation presentation unit which contacts the user through a contact surface and is configured to provide the user with the stimulation in a stimulation region within the contact surface; and a stimulation control unit configured to (i) determine, based on the information indicating the feature of the nearby object, a reference position within the contact surface, and (ii) perform control for causing the stimulation presentation unit to provide the stimulation while changing the stimulation region with reference to the reference position.

In this manner, when the stimulation region in which stimulation is given to the user is changed around the position which corresponds to the nearby object, it is possible to provide user with strong stimulation based on the feature of the nearby object.

Furthermore, for example, the information indicating the feature of the nearby object may be information indicating a position of the nearby object or information indicating a relative position between the user and the nearby object.

More specifically, with respect to certain position information, when the stimulation is provided while changing the stimulation region with reference to the reference position, it is possible to provide the user with strong stimulation irrespective of a change in position of the nearby object. Thus, the user can clearly perceive the position of the nearby object.

Furthermore, for example, the stimulation control unit may be configured to perform control for causing the stimulation presentation unit to provide the stimulation while moving a position of the stimulation region around the reference position.

Furthermore, for example, the stimulation control unit may be configured to perform control for causing the stimulation presentation unit to provide stimulation while increasing or decreasing an area of the stimulation region around the reference position.

Furthermore, for example, it may be that the stimulation presentation unit (i) includes a plurality of projectable stimulation units which are provided on the contact surface and each of which is capable of projecting from the contact surface, and (ii) is configured to provide the user with the stimulation by the projection of the projectable stimulation units in the stimulation region.

Furthermore, for example, it may be that the stimulation presentation unit includes a plurality of rotatable stimulation units which are provided on the contact surface and each of which rotates on the contact surface, and the stimulation control unit is configured to identify the rotatable stimulation unit which corresponds to the reference position and perform control for causing the rotatable stimulation unit to rotate.

Furthermore, for example, the information presentation device may further include a contact surface detection unit configured to detect the contact surface.

Furthermore, for example, it may be that the stimulation control unit is configured to (i) calculate a degree of danger based on the information indicating the feature of the nearby object and (ii) cause the stimulation presentation unit to provide stimulation while changing the stimulation region based on the degree of danger.

Furthermore, for example, the stimulation control unit may be configured to perform control for causing the stimulation presentation unit to provide stimulation while changing the stimulation region more quickly when the distance between a position of the user and a position of the nearby object is shorter.

With this, the user can perceive the distance between the position of the moving object and the position of the nearby object with the rate of change of the stimulation region.

Furthermore, for example, the stimulation control unit may be configured to perform control for causing the stimulation presentation unit to provide stimulation while changing the stimulation region more quickly when a position of the nearby object changes to a greater degree.

With this, the user can perceive a change in position of the nearby object (speed of the nearby object) with the rate of change of the stimulation region.

Furthermore, for example, the stimulation control unit may be further configured to cause a change in stimulus strength based on the information indicating the feature of the nearby object.

Furthermore, for example, the stimulation control unit (i) determines a first reference position within the contact surface based on information indicating the feature of the nearby object and performs control for causing the stimulation presentation unit to provide stimulation while changing over time the stimulation region with reference to the first reference position, and (ii) subsequently, when determining within the contact surface a second reference position different from the first reference position based on the information indicating the feature of the nearby object, performs control for causing the stimulation presentation unit to provide stimulation while changing over time the stimulation region with reference to the second reference position.

In the case of the above, for example, when two automobiles are present around the user, the stimulation control unit may assign the position of the first automobile to a first reference position, assign a second automobile to a second reference position, and perform control to cause stimulation to be provided while causing the respective stimulation regions to be independently changed over time.

Furthermore, a method for controlling an information presentation device according to an aspect of the present invention is a method for controlling an information presentation device which contacts a user through a contact surface and provides, in a stimulation region within the contact surface, stimulation corresponding to a feature of a nearby object around the user, the method including: obtaining information indicating the feature of the nearby object; determining, based on the information indicating the feature of the nearby object, a reference position within the contact surface; and providing the user with stimulation while changing the stimulation region with reference to the reference position.

The following describes embodiments of the present invention, with reference to drawings. Each of the embodiments describes an example in which the information presentation device according to the present invention is applied to an automobile and a user who drives the automobile.

Note that, the embodiments below are specific examples of the present invention. Numerical values, structural elements, the arrangement and connection configuration of the structural elements, steps, the sequence of the steps, and so on, described in the embodiments below are merely examples and are not intended to limit the present invention. Furthermore, among the structural elements in the following embodiments, those structural elements which are not described in the independent claims indicating the broadest concept of the present invention are described as arbitrary structural elements.

Embodiment 1

FIG. 1 is a block diagram showing a system configuration of an information presentation device according to Embodiment 1.

An information presentation device 100 includes an obtainment unit 110, a stimulation control unit 120, and a stimulation presentation unit 130. The information presentation device 100 provides user, who is traveling by an automobile (moving object), stimulation corresponding to the position of a nearby object.

The obtainment unit 110 obtains position information indicating the position of a nearby object with respect to the moving object. Typically, the position information of the nearby object is information on distance, which is detected by a millimeter-wave radar provided outside the information presentation device 100, between the moving object and the nearby object. More specifically, the obtainment unit 110 obtains position information from the millimeter-wave radar provided outside the information presentation device 100. Note that, the obtainment unit 110 may obtain position information from a device which uses a stereo camera, a time-of-flight (TOF) distance sensor, a range finder, a global positioning system (GPS), or the like. The obtainment unit 110 may obtain position information via a wired or a wireless link.

The stimulation presentation unit 130 contacts a user through a contact surface, and provides, in a stimulation region within the contact surface, the user with stimulation. In Embodiment 1, the stimulation presentation unit 130 is provided on a driving seat in an automobile, and the contact surface is a backrest of the driving seat. The stimulation presentation unit 130 will be described in detail later.

The stimulation control unit 120 determines a reference position, which is a position within the contact surface, corresponding to position information, and performs control to change a stimulation region with reference to the reference position in providing a user with stimulation. More specifically, in Embodiment 1, the stimulation control unit 120 performs control to cause the stimulation region to move around the reference position, to provide a user with stimulation.

Next, a specific configuration of the stimulation presentation unit 130 is described.

Figure 2:
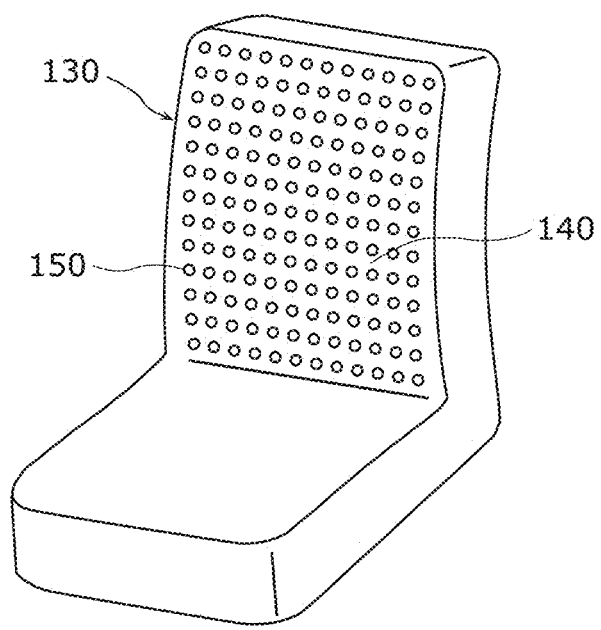
FIG. 2 is a schematic diagram showing a specific configuration of a stimulation presentation unit according to Embodiment 1.

FIG. 2 is a schematic diagram showing a specific configuration of the stimulation presentation unit 130 according to Embodiment 1.

As described above, in Embodiment 1, the stimulation presentation unit 130 is provided on the driving seat of an automobile, and a contact surface 140 is the backrest of the driving seat which contacts the back of a user. The contact surface 140 includes a plurality of projectable stimulation units 150 arranged in a matrix. Each of the projectable stimulation units 150 projects toward a user from the contact surface 140 only when stimulation is provided to the user, and does not projects from the contact surface 140 under normal conditions. Note that, the number of the projectable stimulation units 150 shown in FIG. 2 is merely an example, and is not necessarily accurately drawn. The same applies to the following drawings.

Whether the projectable stimulation unit 150 is projected or not projected is controlled by a piezoelectric element (piezoelectric actuator) which is provided to each of the projectable stimulation units 150. More specifically, the stimulation control unit 120 controls the projection of the projectable stimulation units 150 by controlling a voltage applied to the piezoelectric element provided to each of the projectable stimulation units 150.

Note that, whether the projectable stimulation unit 150 is projected or not projected may be controlled by a solenoid coil. The control is also possible by a gel actuator or a small actuator, such as a stacked-type electrostatic actuator.

Next, operations performed by the information presentation device 100 are described.

Figure 3:
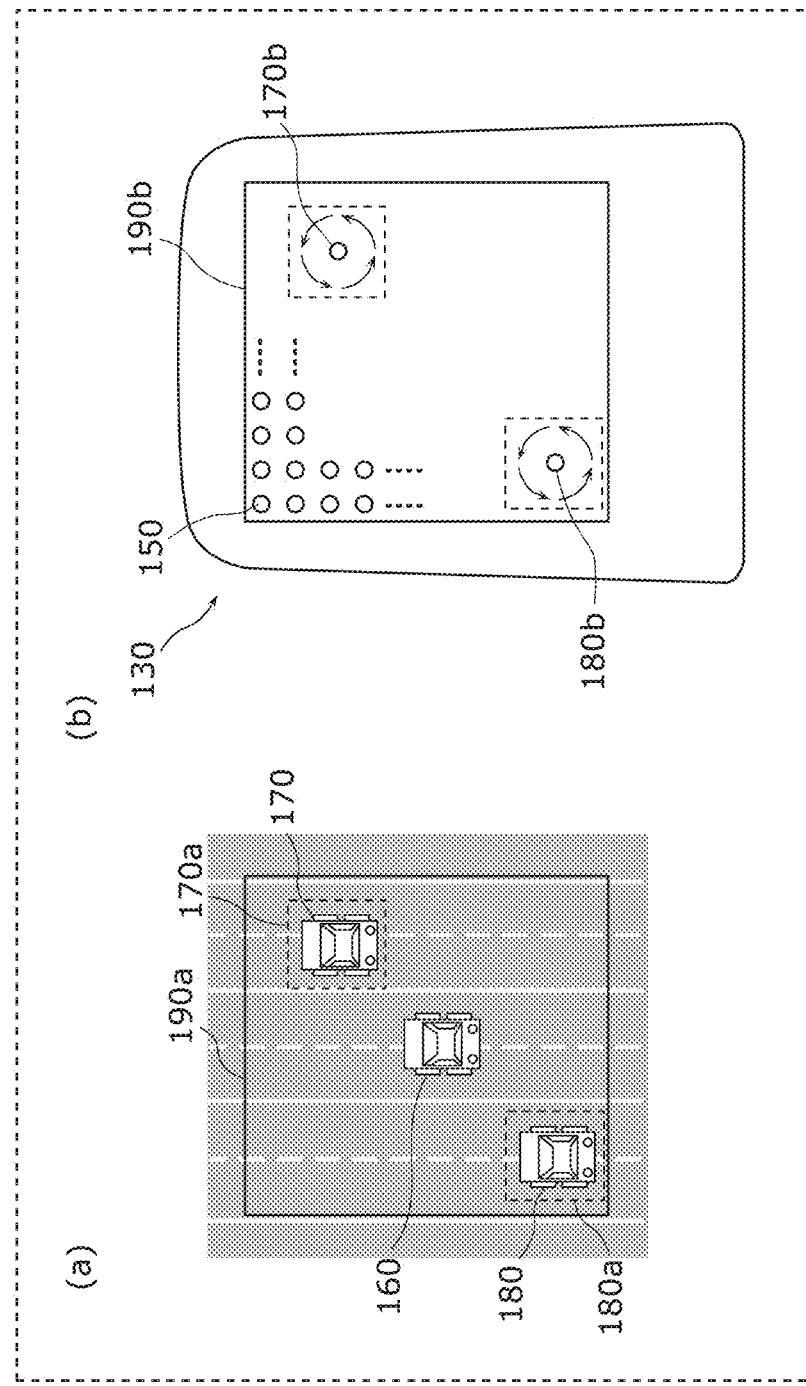
FIG. 3 is a diagram for describing operations performed by the information presentation device according to Embodiment 1.

FIG. 3 is a diagram for describing operations performed by the information presentation device 100.

In FIG. 3, (a) is a schematic diagram showing, from above, a positional relationship between a moving object driven by a user and nearby objects, and (b) is a cross-sectional view which shows the stimulation presentation unit 130 from behind the driving seat.

Figure 4:
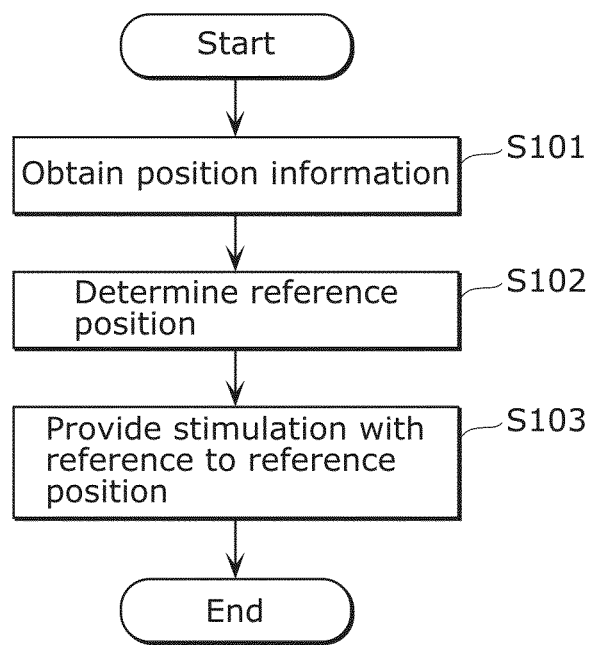
FIG. 4 is a flowchart of operations performed by the information presentation device according to Embodiment 1.

FIG. 4 is a flowchart showing operations performed by the information presentation device 100.

First, the obtainment unit 110 obtains position information of a nearby object within a range of detection 190a of the millimeter-wave radar (S101 in FIG. 4). More specifically, as shown in (a) in FIG. 3, the obtainment unit 110 obtains information on a position 170a of a nearby object 170 and information on a position 180a of a nearby object 180 with respect to a moving object 160 driven by a user. Note that, in (a) in FIG. 3, the upside is the direction in which the moving object 160 is traveling. Although (a) in FIG. 3 is a schematic diagram in which the nearby objects are assumed to be automobiles, the nearby objects may be a building, a pedestrian, or the like as a matter of course.

Next, the stimulation control unit 120 determines a reference position (S102 in FIG. 4). The reference position is a position, which is a position within the contact surface, corresponding to position information of the nearby object. More specifically, as shown in (b) in FIG. 3, the stimulation control unit 120 determines, in a contact surface 190b corresponding to the range of detection 190a, a projectable stimulation unit 170b corresponding to the position 170a and a projectable stimulation unit 180b corresponding to the position 180a as reference positions. Note that, the reference position need not necessarily be the projectable stimulation unit 150, and a portion which is within the contact surface 190b and does not include the projectable stimulation unit 150 may be determined as the reference position.

For example, the stimulation control unit 120 can determine, as the reference position, the projectable stimulation unit 170b positioned closest to the position corresponding to the position 170a in the contact surface 190b based on a relative relationship between the range of detection 190a and the contact surface 190b.

Note that, in an example shown in FIG. 3, the center of the contact surface 190b corresponds to the position of the moving object 160. However, the position corresponding to the moving object 160 in the contact surface 190b may be set at any position.

Lastly, the stimulation control unit 120 performs control for causing the projectable stimulation units 150, which are included in the contact surface 190b and used to provide the user with stimulation, to project in sequence, and thus allows the stimulation presentation unit 130 to provide stimulation (S103 in FIG. 4). More specifically, for example, the stimulation control unit 120 performs control to cause the projectable stimulation units 150 to project in a clockwise sequence around the reference position when seen from the user side. In other words, a stimulation region (the projectable stimulation unit 150 which is projected) in the contact surface 190b which provides the user with stimulation moves around the reference position (take turns) on the contact surface 190b.

Figure 5:
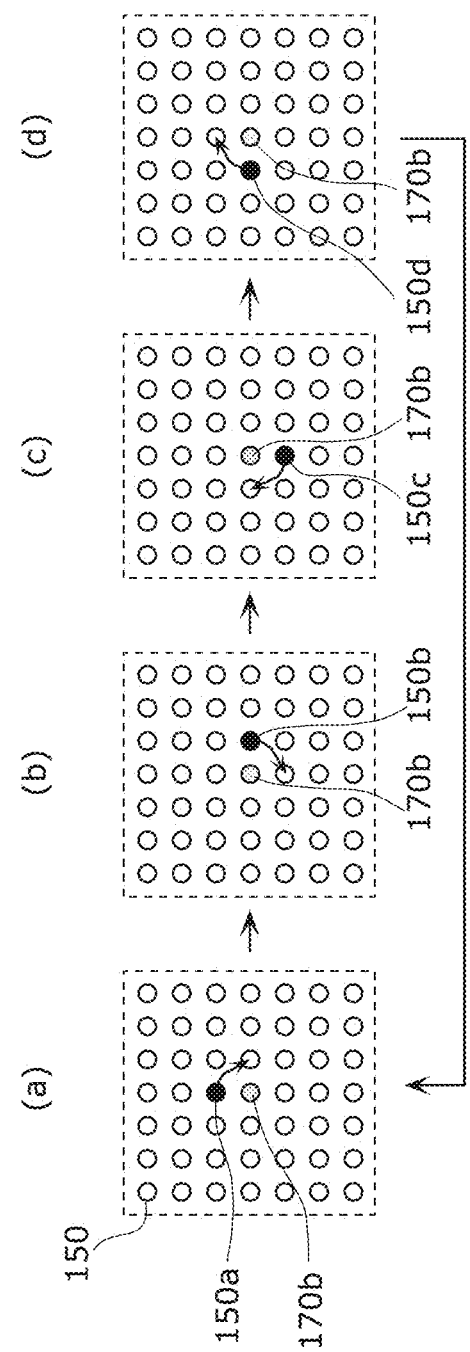
FIG. 5 is a diagram showing an example of a method of controlling used by a stimulation control unit to provide stimulation.

FIG. 5 is a diagram showing an example of a method of controlling used by a stimulation control unit 120 to provide stimulation.

FIG. 5 is, different from (b) in FIG. 3, a diagram showing, from the user side, the contact surface 190b near the projectable stimulation unit 170b in (b) in FIG. 3. In the figure, each of the projectable stimulation units 150 indicated by a white circle represents the projectable stimulation unit which is not projected from the contact surface 190b. Furthermore, projectable stimulation units 150a, 150b, 150c, and 150d indicated by black circles represent the projectable stimulation units which are projected from the contact surface 190b. The projectable stimulation unit 170b is a projectable stimulation unit which is determined as the reference position by the stimulation control unit 120. Note that, although FIG. 5 only shows near the projectable stimulation unit 170b in the contact surface 190b, the same applies to near the projectable stimulation unit 180b.

As shown in FIG. 5, the stimulation control unit 120 controls the projection of the projectable stimulation unit 150 to cause the projected projectable stimulation unit (i.e., the stimulation region) to move around the projectable stimulation unit 170b, when seen from the user side.

More specifically, subsequent to the state in (a) in FIG. 5 in which only the projectable stimulation unit 150a is projected, the stimulation control unit 120 causes only the projectable stimulation unit 150b to be projected. Subsequent to the state in (b) in FIG. 5 in which only the projectable stimulation unit 150b is projected, the stimulation control unit 120 causes only the projectable stimulation unit 150c to be projected as shown in (c) in FIG. 5, and subsequently, causes only the projectable stimulation unit 150d to be projected as shown in (d) in FIG. 5. Subsequent to the state shown in (d) in FIG. 5 in which only the projectable stimulation unit 150d is projected, the stimulation control unit 120 causes only the projectable stimulation unit 150a to be projected as shown in (a) in FIG. 5, and the control is iterative thereafter.

Note that, when the position relationship between the moving object 160 and the nearby object 170 is changed, the stimulation control unit 120 determines, as the reference position, the projectable stimulation unit 150 different from the projectable stimulation unit 170b, and performs a similar control with the determined projectable stimulation unit 150 as the center.

In this manner, the stimulation control unit 120 controls the projection of the projectable stimulation unit 150 to cause the projected projectable stimulation unit 150 to move around the projectable stimulation unit 170b. With this, the user can perceive rotating-like stimulation around the reference position. In other words, even when the position of the nearby object 170 does not change, and thus there is no change in the projectable stimulation unit 150 which is the reference position, stimulation can be provided to the user. Thus, stronger stimulation can be provided compared to the conventional technique.

When stimulation is kept applied to a same position, the sensitivity to perceive the stimulation decreases. Usually, the stimulation applied to a user is approximately obtained according to Expression (1) below.

stimulation=amount of change in area of the stimulation region per unit time×magnitude of stimulation×sensation coefficient of a receptive field     (Expression 1)

In Expression (1), the sensation coefficient of the receptive field is a parameter which depends on space resolution of the stimulation region and frequency response of the receptive field of skin through which a user perceives stimulation.

As shown in Expression (1), stimulation applied to a user is greater with the presentation method in which the position of stimulation (stimulation region) is changed than with a presentation method in which a position of stimulation is not changed but the magnitude is changed. Stated differently, the sensitivity of a user to perceive stimulation increases. Thus, in this manner, the information presentation device 100 constantly changes the stimulation region, and thus it is possible to provide a user with stimulation (information) without causing a decrease in the sensitivity of a user to perceive stimulation.

Note that, the method of providing stimulation by the stimulation control unit 120 shown in FIG. 5 is an example, and the method is not limited to this example. The stimulation control unit 120 may provide a user with stimulation while changing the stimulation region with reference to the reference position.

Figure 6:
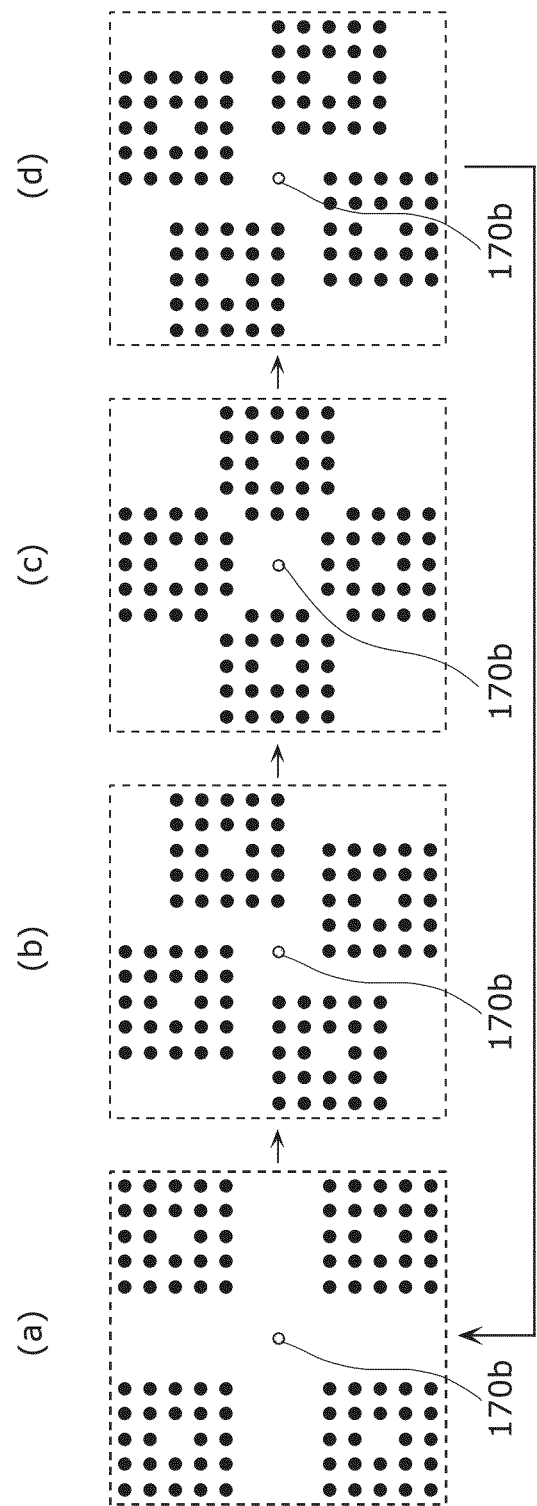
FIG. 6 is a diagram showing a first modification of a method of controlling used by the stimulation control unit to provide stimulation.
Figure 7:
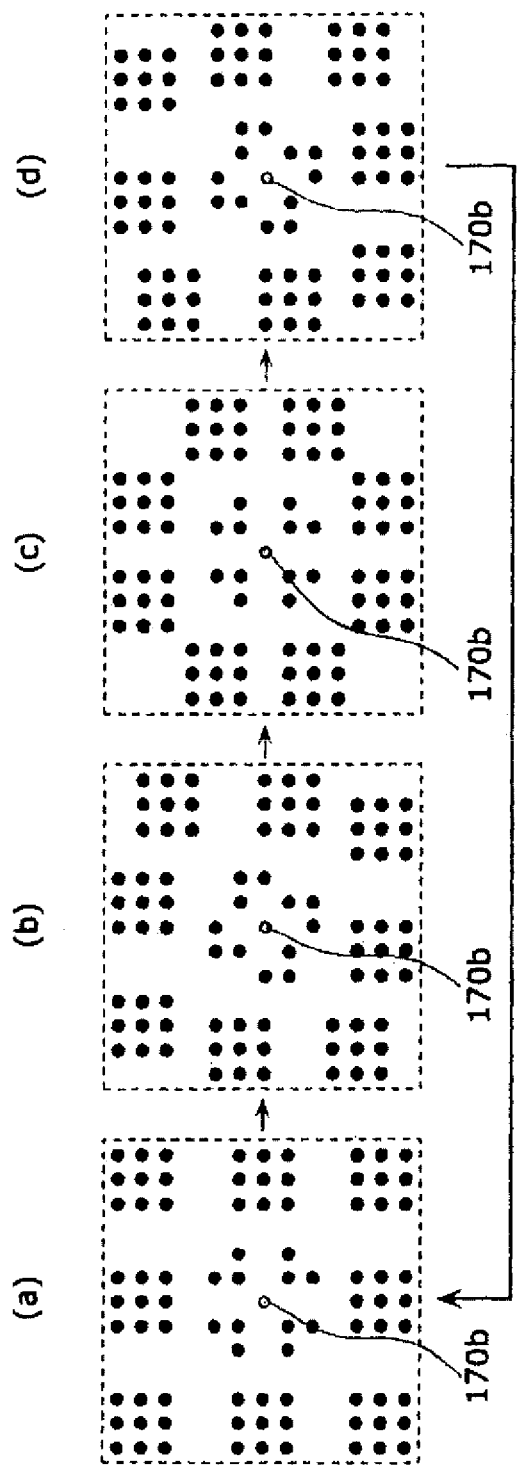
FIG. 7 is a diagram showing a second modification of a method of controlling used by the stimulation control unit to provide stimulation.
Figure 8:
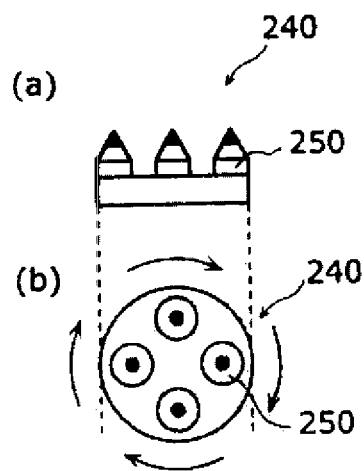
Figure 9:
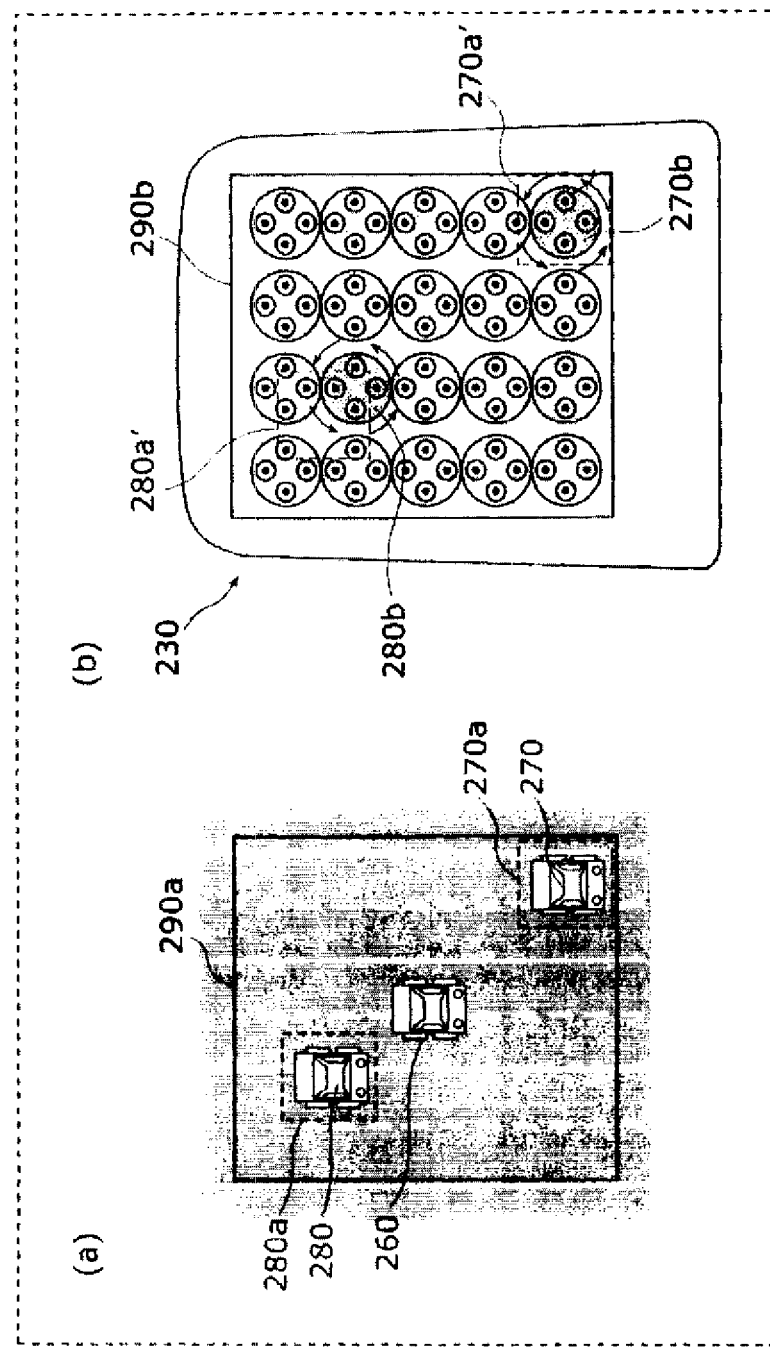
Figure 10:
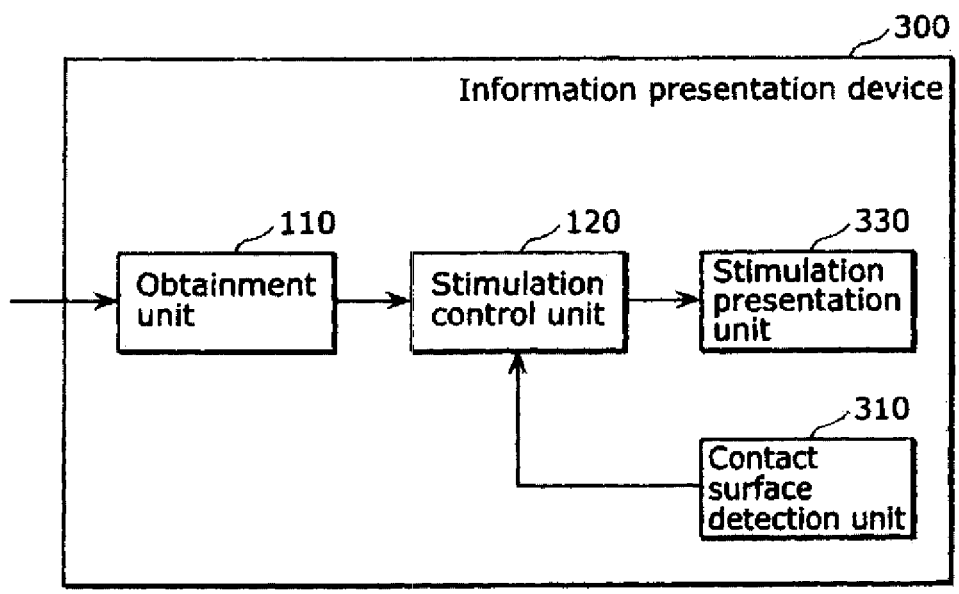
Figure 11:
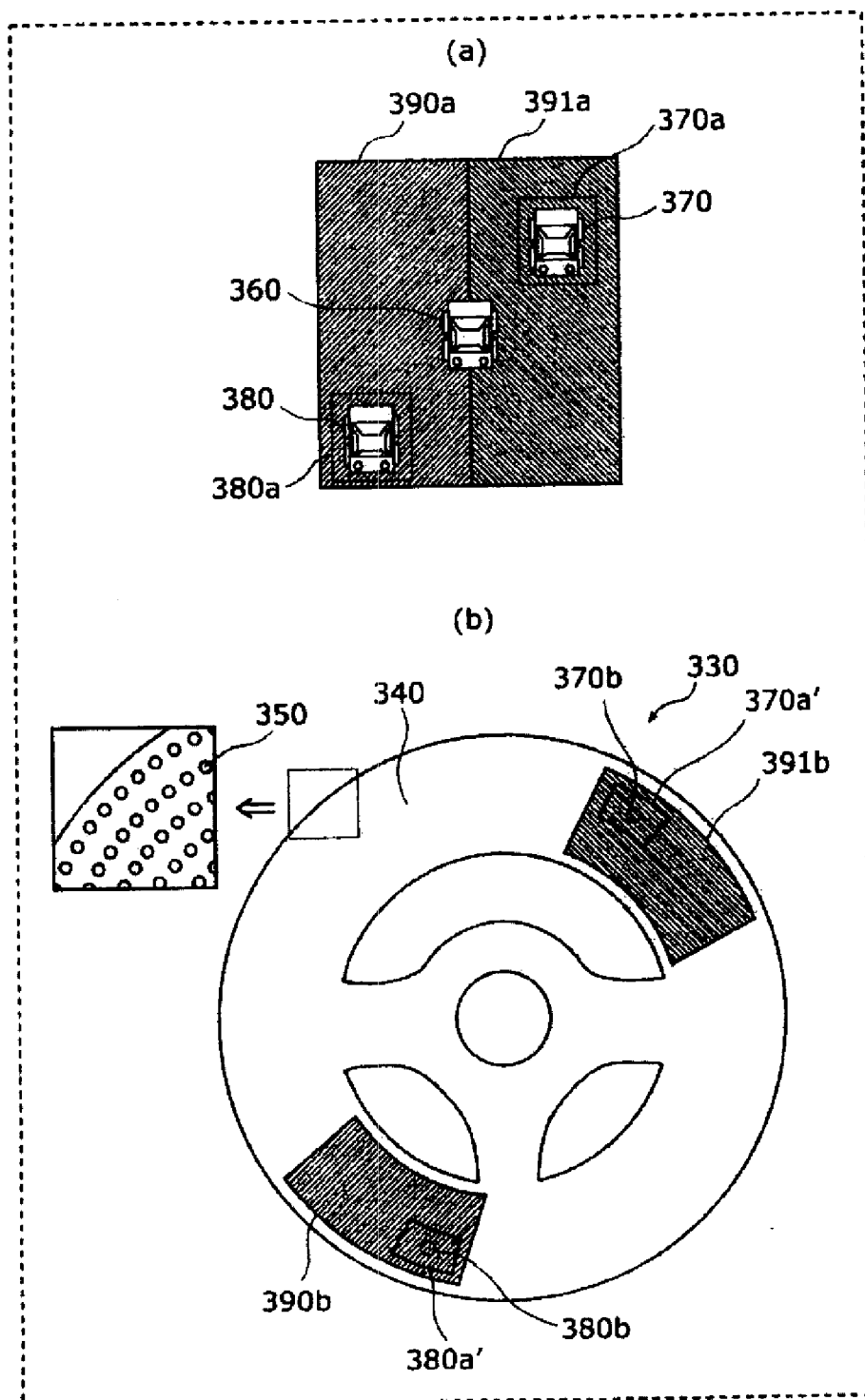
Figure 12:
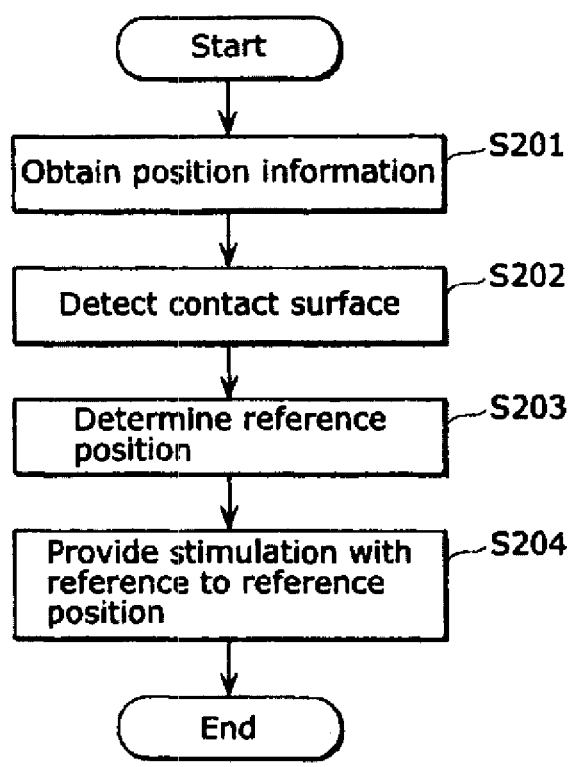

Each of FIG. 6 and FIG. 7 is a diagram showing another example of a method of controlling used by the stimulation control unit 120 to provide stimulation. Note that, illustration of the projectable stimulation units 150 which are not projected is omitted in FIG. 6 and FIG. 7.

As shown in (a) to (d) in FIG. 6, the stimulation control unit 120 may control the projection of the projectable stimulation units 150 to cause each of four stimulation blocks, which form a stimulation region, to move around the reference position. In an example shown in FIG. 6, each of the stimulation blocks includes 24 projected projectable stimulation units.

Furthermore, as shown in (a) to (d) in FIG. 7, the number of stimulation blocks and the number of projected projectable stimulation units included in the stimulation block need not be constant while the stimulation is provided.

As shown in FIG. 7, the number of stimulation blocks, and the projected projectable stimulation units included in the stimulation block need not necessarily be constant during the rotation.

Note that, it is preferable that a change in stimulation region be adjusted corresponding to the receptive field of the skin of the user which contacts the contact surface 140. With this, the sensation coefficient of the receptive field in Expression (1) above can be optimized.

Note that, although Embodiment 1 describes that the projectable stimulation units 150 are arranged on the contact surface 140 to form a matrix, the projectable stimulation units 150 may be arranged on the contact surface 140 to form a honeycomb shape. Furthermore, the projectable stimulation units 150 may be provided on the seating surface of the driving seat as a matter of course.

Note that, the contact surface 140 of the stimulation presentation unit 130 may include a plurality of electrodes arranged in a matrix in place of the projectable stimulation units 150. More specifically, the stimulation control unit 120 may provide a user with stimulation by applying a weak current from the electrode.

Furthermore, the contact surface 140 may include a plurality of air holes arranged in a matrix in place of the projectable stimulation units 150. More specifically, the stimulation control unit 120 may provide a user with stimulation using air pressure through air holes provided on the stimulation presentation unit 130.

In a similar manner, the stimulation control unit 120 may provide a user with stimulation not only by directly sending air to a user, but also by pushing out or retracting a projection, such as a balloon, using air pressure.

As described, the stimulation presentation unit 130 is not limited to a configuration using the projectable stimulation units 150. For example, the stimulation presentation unit 130 may include a plurality of rotatable stimulation units.

Figure 8:
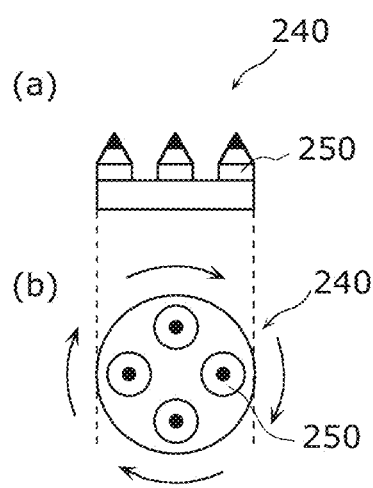
FIG. 8 shows a configuration of a rotatable stimulation unit.

FIG. 8 shows a configuration of a rotatable stimulation unit. In FIG. 8, (a) is a diagram showing the rotatable stimulation unit from a side, and (b) is a diagram showing the rotatable stimulation unit from above.

As shown in FIG. 8, a rotatable stimulation unit 240 includes four protrusions 250. The rotatable stimulation units 240 are arranged to form a matrix on the contact surface 140 of a stimulation presentation unit 230, as with the projectable stimulation units 150. Each of the rotatable stimulation units 240 rotates with respect to the contact surface 140.

Figure 9:
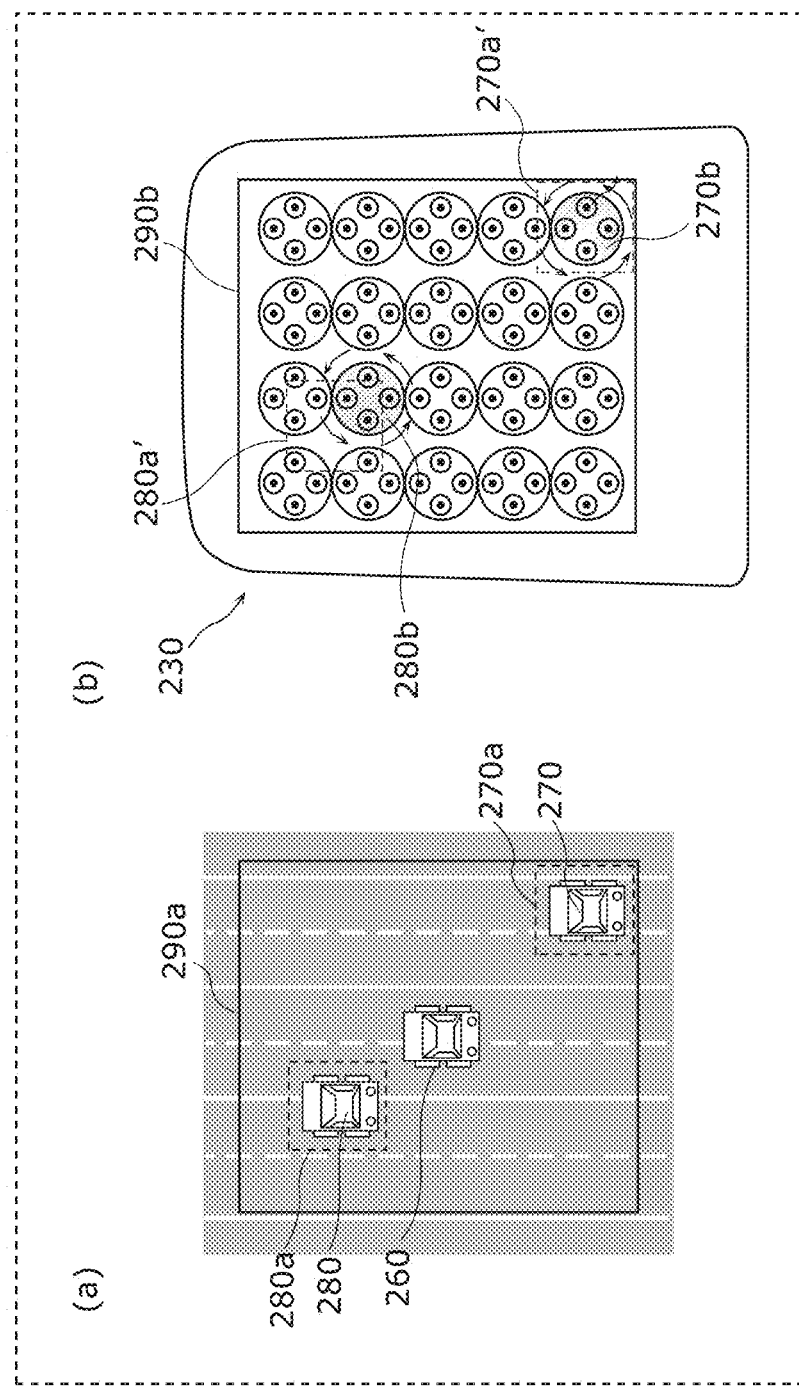
FIG. 9 is a diagram for describing operations performed by an information presentation device which uses a rotatable stimulation unit.

FIG. 9 is a diagram for describing operations performed by an information presentation device using the rotatable stimulation unit 240. Note that, the flowchart of operations is the same as the flowchart in FIG. 4.

First, the obtainment unit 110 obtains position information of a nearby object within a range of detection 290a of the millimeter-wave radar (S101 in FIG. 4). More specifically, as shown in (a) in FIG. 9, the obtainment unit 110 obtains information on a position 270a of a nearby object 270 and information on a position 280a of a nearby object 280 with respect to a moving object 260.

Next, the stimulation control unit 120 determines the reference position within the contact surface (S102 in FIG. 4). More specifically, as shown in (b) in FIG. 9, in a contact surface 290b corresponding to the range of detection 290a, the stimulation control unit 120 determines as reference positions (i) a rotatable stimulation unit 270b which is closest to a position 270a' corresponding to the position 270a and (ii) a rotatable stimulation unit 280b which is closest to a position 280a' corresponding to the position 280a.

Lastly, the stimulation control unit 120 causes the rotatable stimulation units 270b and 280b to rotate to allow the stimulation presentation unit 130 to provide stimulation (S103 in FIG. 4).

In this manner, a configuration in which the rotatable stimulation units 240 including a plurality of the protrusions 250 are arranged in a matrix is advantageous in that, compared to a configuration using the projectable stimulation units 150, it is possible to reduce a control resource, simplify the control, and reduce a device size of the stimulation control unit 120.

Furthermore, in the stimulation presentation unit 230 using the rotatable stimulation unit 240, the rotation speed of the rotatable stimulation unit may be changed corresponding to the speed of movement of a nearby object. More specifically, the stimulation control unit 120 may increase the rotation speed of the rotatable stimulation unit 240 more when the position of the nearby object changes to a greater degree. Furthermore, the size of the nearby object may be measured with the millimeter-wave radar or the like, and the stimulation control unit 120 may increase the rotation speed of the rotatable stimulation unit 240 more as the size of the nearby object increases.

The above-described movement speed or size of the nearby object may be used as a parameter indicating a degree of danger. Thus, the stimulation control unit 120 can make a user aware of a degree of danger by increasing stimulation provided to the user, that is, by increasing the speed of rotation speed as the degree of danger increases.

Note that, the information presentation device 100 may include a unit for estimating degree-of-danger and may determine the degree of danger based on other than the movement speed or size of the nearby object. For example, when the moving object is equipped with a drive recorder or a camera, such as a back monitor, the unit for estimating degree-of-danger can detect a person by a contour or a histogram of an edge (gradient direction of brightness) with image processing and image recognition input from a camera. When a person is detected by the unit for estimating degree-of-danger, the stimulation control unit 120 may determine that the degree of danger is high and increase the rotation speed of the rotatable stimulation unit 240.

Moreover, the unit for estimating degree-of-danger may detect not only a person but a type of an automobile through learning using a similar scheme, and differentiate a heavy vehicle, such as a truck or a bus, a general vehicle, and others to determine the degree of danger. At this time, for example, in the case where a heavy vehicle is detected, the degree of danger may be increased considering the risk at the time of collision, and the stimulation control unit 120 may increase the speed of rotation of the rotatable stimulation unit 240 to be greater than a rotation speed of the rotatable stimulation unit 240 of the case in which a general vehicle is detected.

Moreover, the unit for estimating degree-of-danger may, when used with the image processing and image recognition, perform the above-described detection not only based on the contour or the histogram of the edge (the gradient direction of brightness) but also based on an amount of feature, such as an optical flow or a local autocorrelation.

Furthermore, in the future, when intelligent transportation systems (ITS) for automobiles further advance and an era comes in which short-distance communication is performed among automobiles, it is assumed that a type of a nearby vehicle can be determined based on the result of the short-distance communication. Furthermore, it is also assumed that a pedestrian or the like also gives out position information in a short range to be safe, resulting in an easier detection of a pedestrian in a short range.

In this case, the unit for estimating degree-of-danger may recognize the degree of danger by detecting information on vehicles or pedestrians via the short-distance communication. For example, when an existence of a heavy vehicle or a pedestrian is detected in a predetermined distance, the stimulation control unit 120 increases a rotation speed of the rotatable stimulation unit 240, allowing a user to recognize the degree of danger.

Furthermore, through the short-distance communication, it is also possible to obtain driving state of a nearby vehicle (e.g., how fast a vehicle is traveling, how much a steering wheel is rotated, or the like). Thus, the unit for estimating degree-of-danger may recognize the degree of danger based not only on a type of a vehicle or a presence of a pedestrian but also based on the driving state of the nearby vehicle.

Note that, the information obtained by the obtainment unit 110 is not limited to the position information. For example, the obtainment unit 110 may obtain information indicating a feature of a nearby object via a wired or a wireless link. The information indicating the feature of the nearby object may be, for example, the position information. The information may also be information indicating the speeds, the directions, the sizes, the types of the moving object (the user) and the nearby object. When the information obtained by the obtainment unit 110 is the speeds of the user and the nearby object, configuration in which the reference position within the contact surface represents the speed is conceivable.

For example, when it is assumed that the center position within the contact surface of the stimulation presentation unit 130 is the speed of the user, the stimulation control unit 120 may set, the faster the speed of the nearby object is compared to the speed of the user, the reference position at an upper side relative to the center position, and the slower the speed of the nearby object is compared to the speed of the moving object (the user), the reference position at a lower side relative to the center position.

When the obtainment unit 110 obtains information on the type of the nearby object, whether the type of the nearby object is a person or an automobile is recognized, for example. In this case, a camera or the like which is capable of image recognition may be provided outside the information presentation device 100 (e.g., in a moving object).

When the obtainment unit 110 obtains information indicating the type of the nearby object, the stimulation control unit 120 may set the reference position at upper side relative to the center position when the type of the nearby object is a person, and set the reference position at a lower side relative to the center position when the nearby object is an automobile. More specifically, when the obtainment unit 110 obtains information indicating the feature of the nearby object, the stimulation control unit 120 may determine the reference position based on information which shows the feature, and performs control to cause the stimulation presentation unit to provide stimulation while changing the stimulation region with reference to the reference position.

Note that, the stimulation control unit 120 may control a vehicle operation unit, such as a steering wheel or a brake, based on position information obtained by the obtainment unit 110. More specifically, the stimulation control unit 120 may perform control, based on the position information, to apply a load (resistance is applied to the steering wheel operation) for an operation of a steering wheel in a direction where a nearby object is present. Furthermore, for example, based on position information, the stimulation control unit 120 may perform control to slow down or stop the automobile through a brake operation when a nearby object is present in the front.

Note that, the stimulation presentation unit 130 using the projectable stimulation units 150 may change the rate of change of the stimulation region corresponding to the movement speed of a nearby object or a size of a nearby object. Furthermore, a control is conceivable in which, in providing a user with stimulation, the stimulation region is changed more quickly when the distance between the position of the moving objet (the user) and the position of the nearby object is shorter.

Moreover, the stimulation control unit 120 may change the rate of change of the stimulation region corresponding to the degree of danger, and may further change the area of the stimulation region.

The information presentation device 100 according to Embodiment 1 has been thus far described. With the information presentation device 100, a user can dearly perceive through a tactile sensation the position of a nearby object even when the change in position of the nearby object with respect to the user is small.

Embodiment 2

Embodiment 1 described an information presentation device 100 which is applied to a driving seat of an automobile. Embodiment 2 describes an example of an information presentation device which is applied to a steering wheel of an automobile. Note that, in the following description of Embodiment 2, structural elements having the same reference signs as structural elements in Embodiment 1 operate in a similar manner and have similar functions as the corresponding structural elements in Embodiment 1, and the descriptions thereof are omitted.

Figure 10:
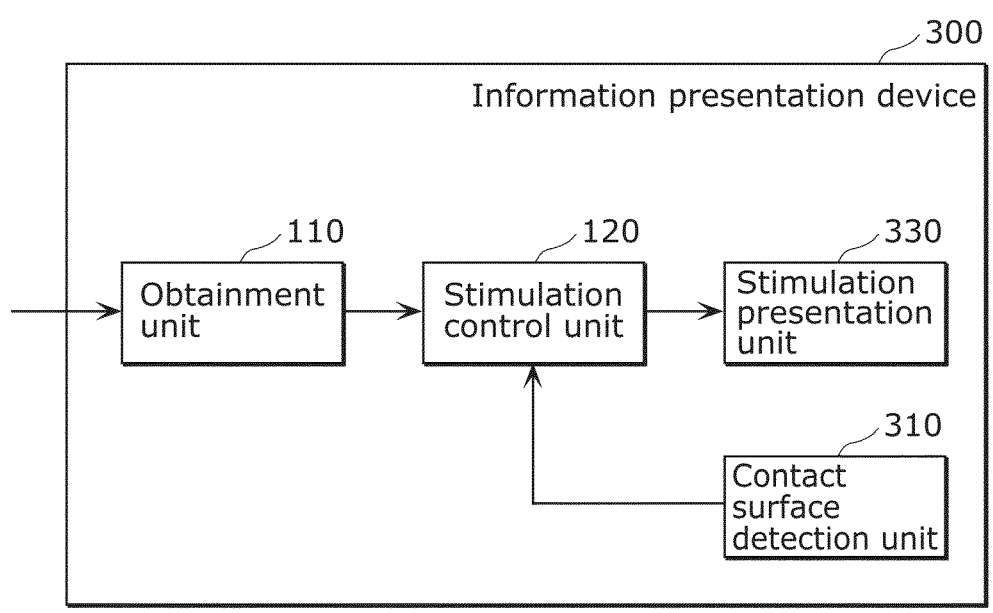
FIG. 10 is a block diagram showing a system configuration of an information presentation device according to Embodiment 2.

FIG. 10 is a block diagram showing a system configuration of an information presentation device according to Embodiment 2.

An information presentation device 300 is different from the information presentation device 100 in that the information presentation device 300 includes a contact surface detection unit 310. Furthermore, as described later, the information presentation device 300 is also different from the information presentation device 100 in that a stimulation presentation unit 330 is provided on a steering wheel of an automobile.

Although the information presentation device 300 is applied to the steering wheel, the position where a user grips the steering wheel is different depending on a user who drives an automobile. Thus, when a reference position is determined with respect to the entire surface of the steering wheel, there is a possibility that stimulation is not appropriately provided to a user when the reference position and the position at which the steering wheel is gripped are significantly different.

In view of this, the information presentation device 300 includes the contact surface detection unit 310, and the contact surface detection unit 310 detects a contact surface that is a region of the steering wheel where the user is gripping with respect to the entire surface of the steering wheel. More specifically, the contact surface detection unit 310 is, for example, a pressure sensor, and detects the contact surface based on the pressure applied by the user by gripping the steering wheel.

Next, the stimulation presentation unit 330 is described with reference to (b) in FIG. 11.

Figure 11:
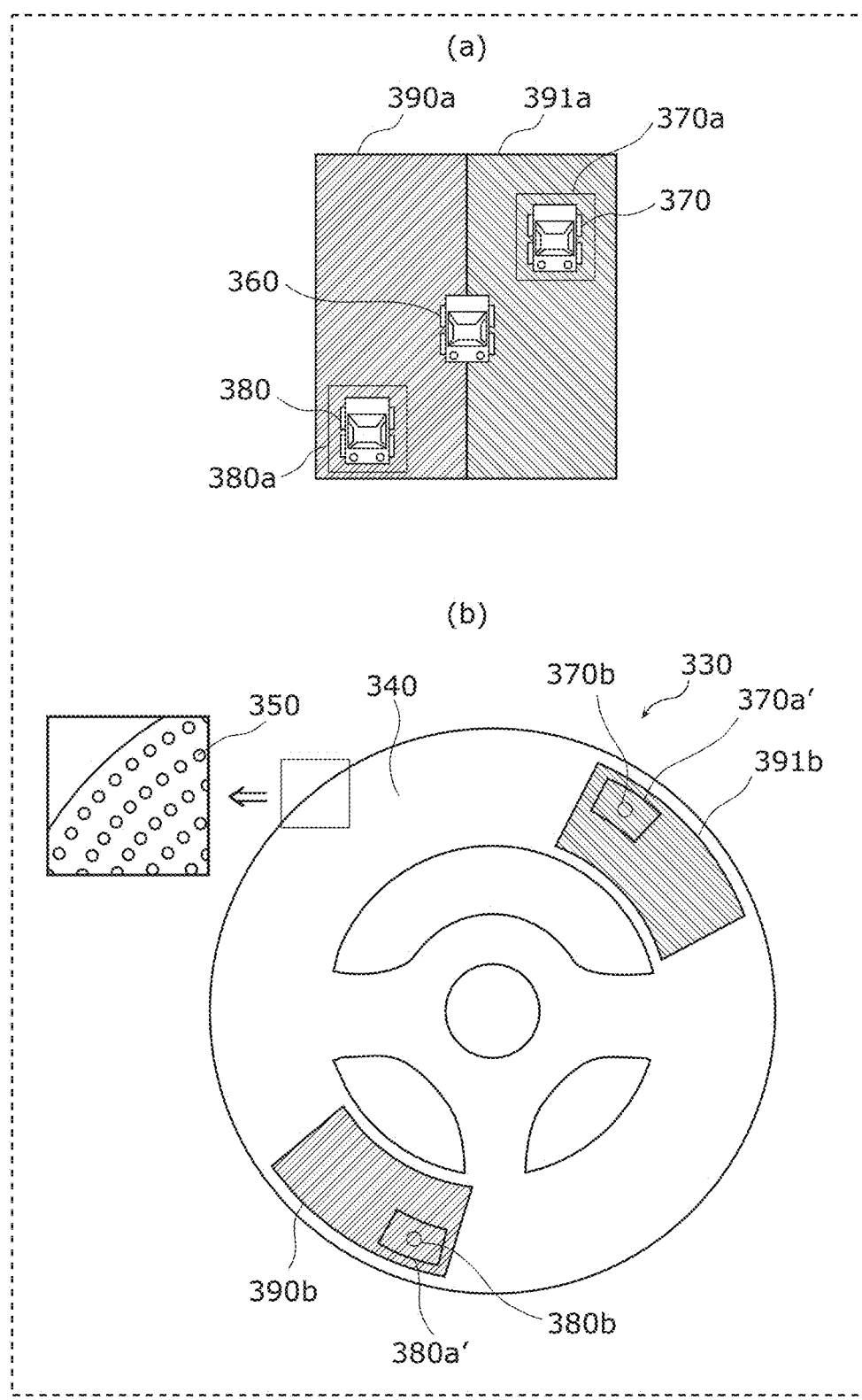
FIG. 11 is a diagram for describing operations performed by a stimulation presentation unit according to Embodiment 2.

(b) in FIG. 11 is a diagram for describing operations performed by the stimulation presentation unit 330.

An entire surface 340 of the steering wheel is the stimulation presentation unit 330 and includes a plurality of the projectable stimulation unit 350. The projectable stimulation unit 350 has a similar configuration as a projectable stimulation unit 150 described in Embodiment 1.

Next, operations performed by the information presentation device 300 are described with reference to the above-described (b) in FIG. 11, (a) in FIG. 11, and FIG. 12.

(a) in FIG. 11 is a schematic diagram showing, from above, positional relationship between the moving object driven by a user and the nearby objects.

Figure 12:
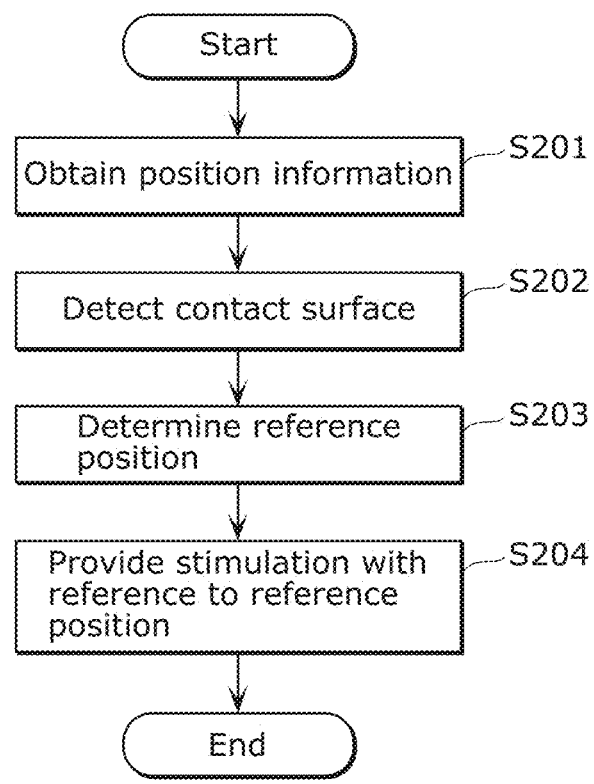
FIG. 12 is a flowchart of operations performed by the information presentation device according to Embodiment 2.

FIG. 12 is a flow chart of operations performed by the information presentation device 300.

First, the obtainment unit 110 obtains position information of the nearby objects which are in the left in a range of detection 390a and in the right in a range of detection 391a relative to the moving direction of a moving object 360 (S201 in FIG. 12). More specifically, as shown in (a) in FIG. 11, the obtainment unit 110 obtains information on a position 370a of a nearby object 370 and information on a position 380a of a nearby object 380 with respect to the moving object 360.

Next, the contact surface detection unit 310 detects the contact surface (S202 in FIG. 12). More specifically, the contact surface detection unit 310 detects, with a pressure sensor, a contact surface 390b and a contact surface 391b that are the regions gripped by the user with respect to the entire surface 340 of the steering wheel.

Next, the stimulation control unit 120 determines the reference position within the contact surface (S203 in FIG. 12). More specifically, as shown in (b) in FIG. 11, in the contact surface 390b corresponding to the range of detection 390a, the stimulation control unit 120 determines as the reference position a projectable stimulation unit 380b in a position 380a' corresponding to the position 380a.

Furthermore, in the contact surface 391b corresponding to the range of detection 391a, the stimulation control unit 120 determines as the reference position a projectable stimulation unit 370b in a position 370a' corresponding to the position 370a.

Lastly, the stimulation control unit 120 causes, in the contact surfaces 390b and 391b, the projectable stimulation unit 350 which is used to provide the user with stimulation to be projected, and thus a user is provided with stimulation (S204 in FIG. 12). More specifically, the stimulation control unit 120 performs control to provide the user with stimulation while increasing or decreasing the area of the stimulation region around the reference position.

Figure 13:
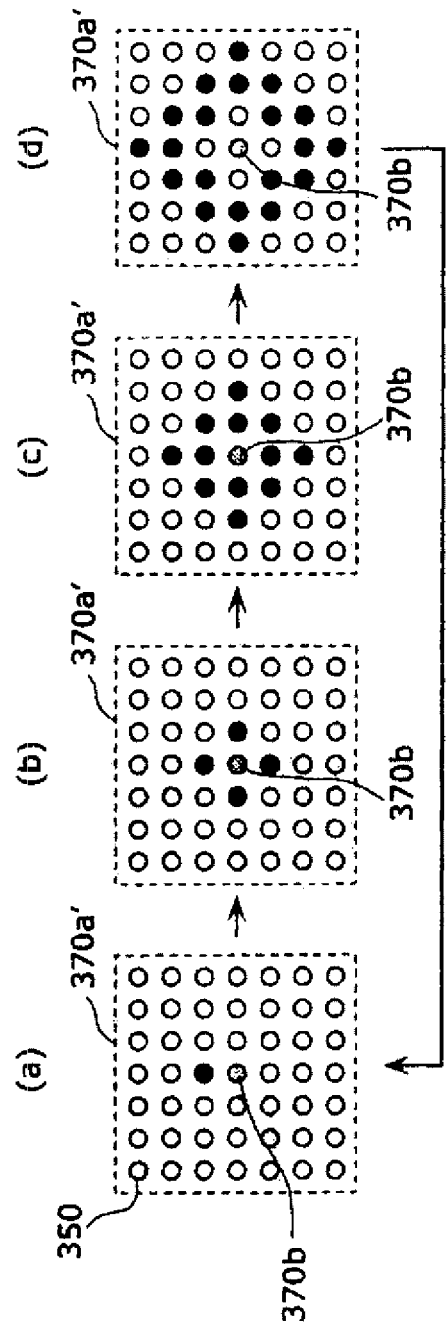
FIG. 13 is a diagram showing a method of providing stimulation by the stimulation control unit according to Embodiment 2.
Figure 14:
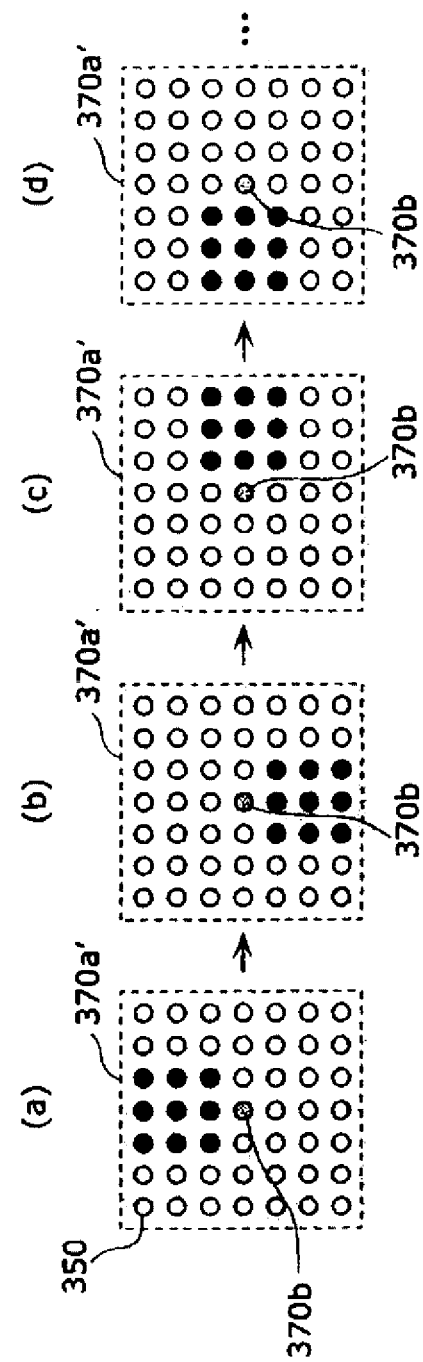
Figure 15:
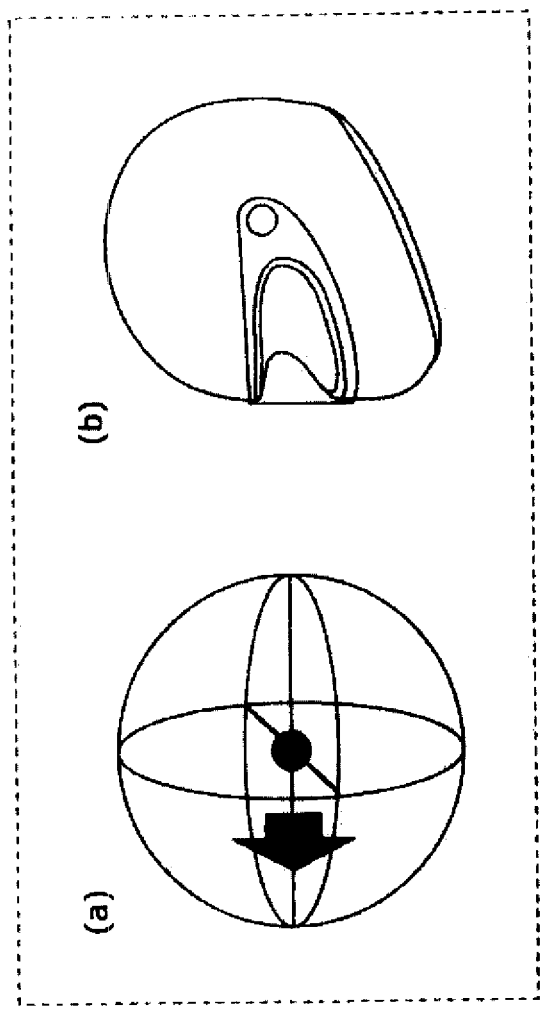

FIG. 13 is a diagram showing an example of a method of providing stimulation used by the stimulation control unit 120 according to Embodiment 2.

FIG. 13 is a diagram showing the position 370a' in (b) in FIG. 11 from the user side. In the figure, each of the projectable stimulation units 350 indicated by a white circle represents the projectable stimulation unit 350 which is not projected from the contact surface 391b. Furthermore, the projectable stimulation units 350 indicated by black circles represent the projectable stimulation units 350 which are projected from the contact surface 391b. The projectable stimulation unit 370b is the projectable stimulation unit 350 which is determined as the reference position by the stimulation control unit 120. Note that, although FIG. 13 only shows the position 370a', the same applies to the position 380a'.

As shown in FIG. 13, the stimulation control unit 120 controls the projection of the projectable stimulation unit 350 to increase or decrease the projected projectable stimulation units 350 radially around the projectable stimulation unit 370b, when seen from the user side. More specifically, the stimulation control unit 120 controls the projection of the projectable stimulation unit 350 to increase or decrease the area of the stimulation region radially around the projectable stimulation unit 370b.

More specifically, the stimulation control unit 120 causes the stimulation region to change to the states shown in (a), (b), (c), and (d) in FIG. 13 in the stated order, to increase the area of the stimulation region. After the stimulation region achieves the state shown in (d) in FIG. 13, the stimulation control unit 120 causes the stimulation region to achieve a state shown in (a) in FIG. 13. Stated differently, the stimulation control unit 120 decreases the area of the stimulation region. The control is iterative thereafter.

Note that, when the positional relationship between the moving object 360 and the nearby object 370 is changed, the stimulation control unit 120 determines, as the reference position, the projectable stimulation unit 350 different from the projectable stimulation unit 370b, and performs a similar control around the determined projectable stimulation unit 350.

Note that, the method of providing stimulation used by the stimulation control unit 120 is not limited to an example shown in FIG. 13. As with Embodiment 1, the stimulation control unit 120 may control the projection of the projectable stimulation unit 350 to cause the projected projectable stimulation unit 350 to move around the projectable stimulation unit 370b.

Furthermore, the stimulation control unit 120 may cause the projectable stimulation unit 350 to be projected randomly around the projectable stimulation unit 370b.

Figure 14:
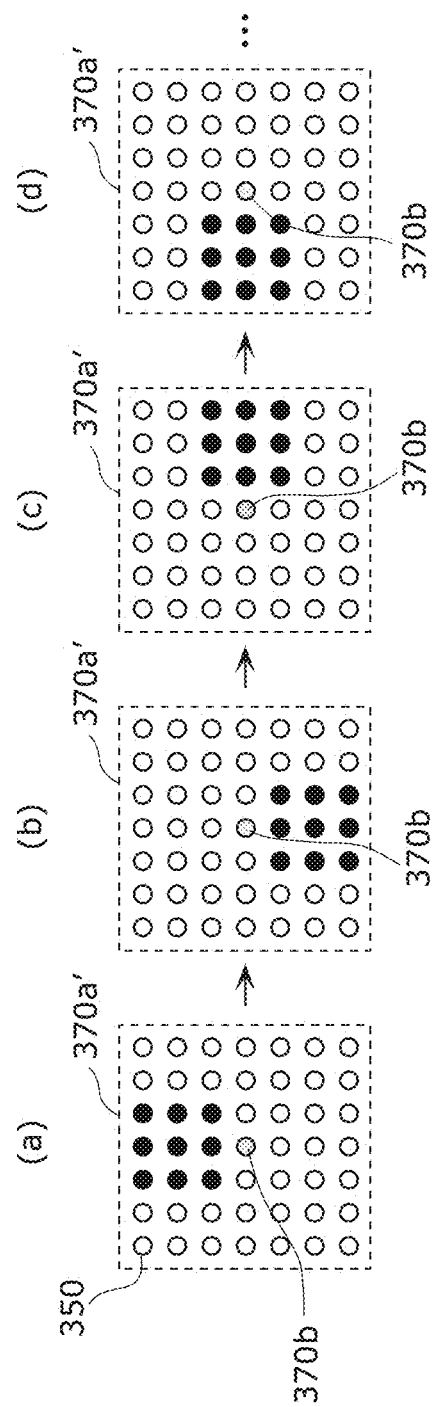
FIG. 14 is a diagram showing another example of the method of providing stimulation by the stimulation control unit according to Embodiment 2.

FIG. 14 is a diagram showing another example of a method of providing stimulation used by the stimulation control unit 120 according to Embodiment 2. As shown in FIG. 14, the stimulation control unit 120 needs not necessarily change the stimulation region periodically, and may change the stimulation region randomly.

Note that, in the information presentation device 100 described in Embodiment 1, the stimulation control unit 120 may cause the stimulation region to be increased or decreased radially or cause the stimulation region to be changed randomly.

The information presentation device 300 according to Embodiment 2 has been thus far described. With the information presentation device 300, a user can clearly perceive through a tactile sensation the position of a nearby object even when the change in position of the nearby object with respect to the user is small.

Note that, when the stimulation presentation unit 330 is provided on the steering wheel as with Embodiment 2, unlike the driving seat, there are cases where it may not be able to provide a sufficient area of contact with the user. In such a case, the position information obtained by the obtainment unit 110 may be simplified and the simplified position may be used as the reference position.

More specifically, the information presentation device 300 may have a configuration which indicates a rough position of a nearby object. For example, even when the information presentation device 300 only informs the user of in which side, left, right, front, or back, the nearby object which is outside the line of sight exists with respect to the automobile the user is driving, it is possible to reduce an accident which occurs due to failure to recognize the nearby vehicle when changing lanes.

Other Embodiments

The above-described embodiments described an example in which the present invention is applied to the driving seat or the steering wheel of an automobile. However, the present invention is not limited to the above-described embodiments. For example, the present invention is applicable to moving objects, such as a submarine, an airplane, or a spaceship.

Furthermore, for example, the information presentation device is applicable to a walking assistance device for a person with impaired vision. In this case, the stimulation presentation unit can be realized in a belt-like form worn on the abdominal region or the back of a user or a cloth-like (jacket-like) form. Stated differently, the present invention can also be realized in a form of an object worn by a user.

Figure 15:
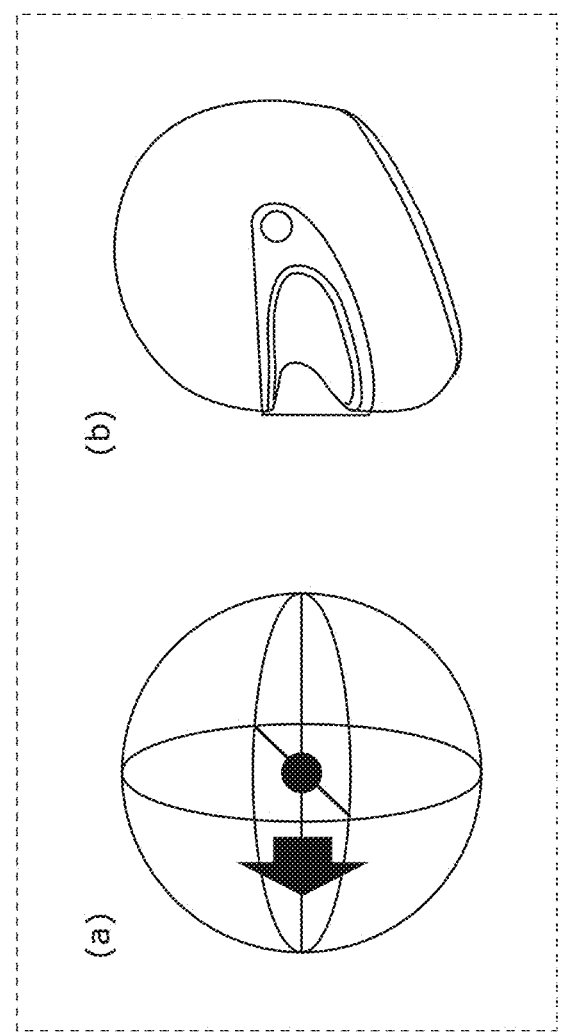
FIG. 15 is a diagram for describing an information presentation device applied to a helmet.
Figure 1:
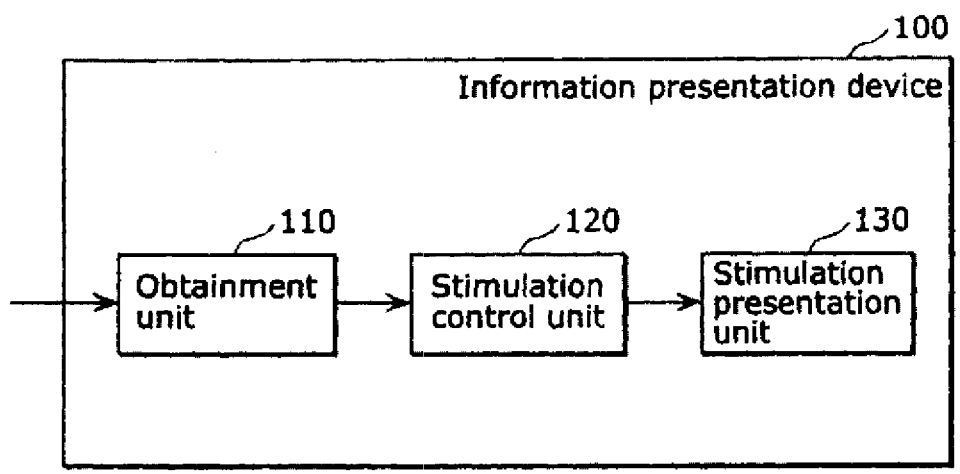
Figure 2:
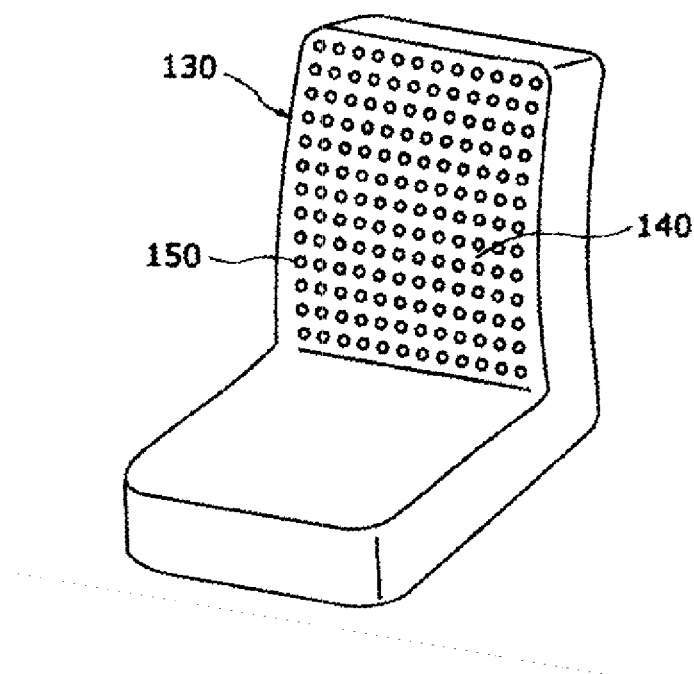
Figure 3:
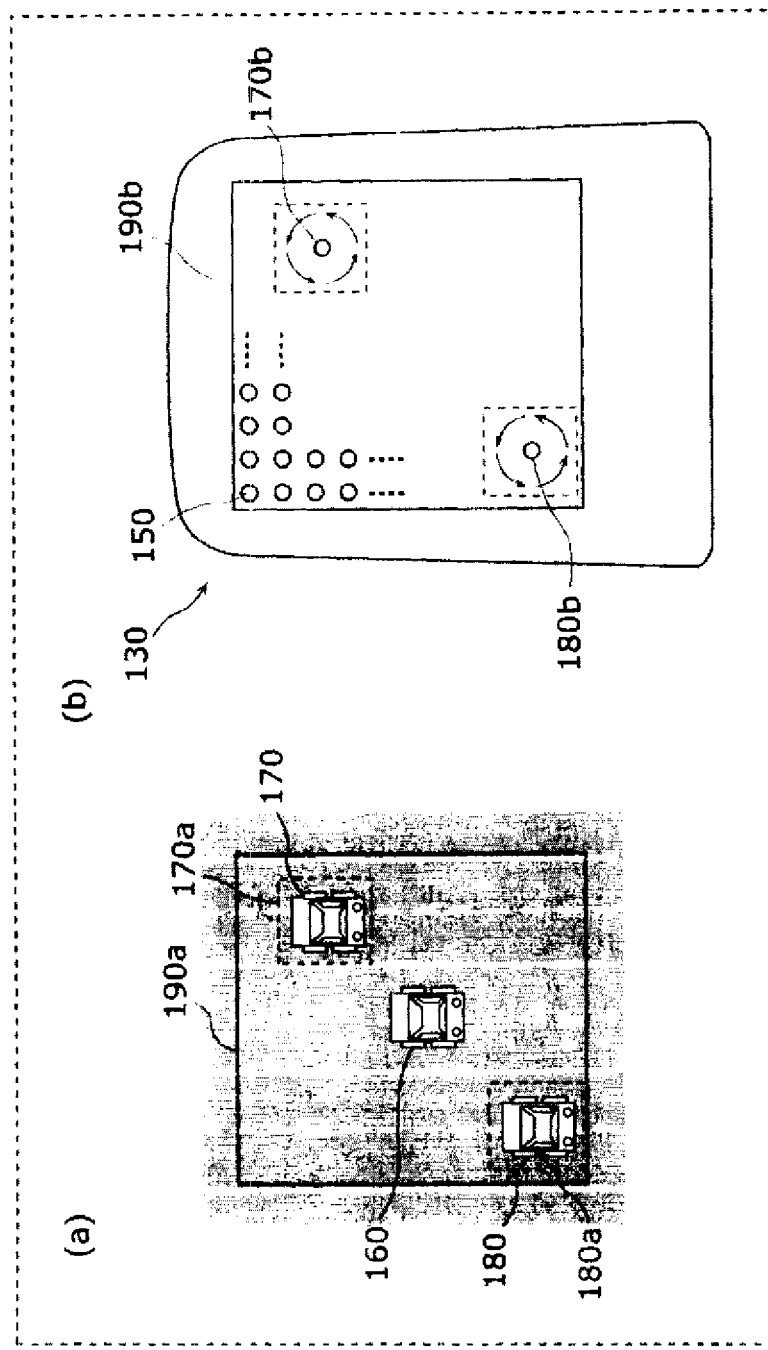
Figure 4:
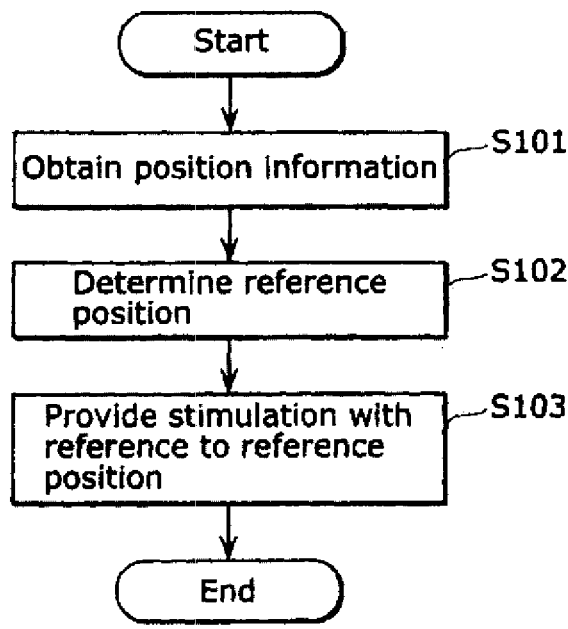
Figure 6:
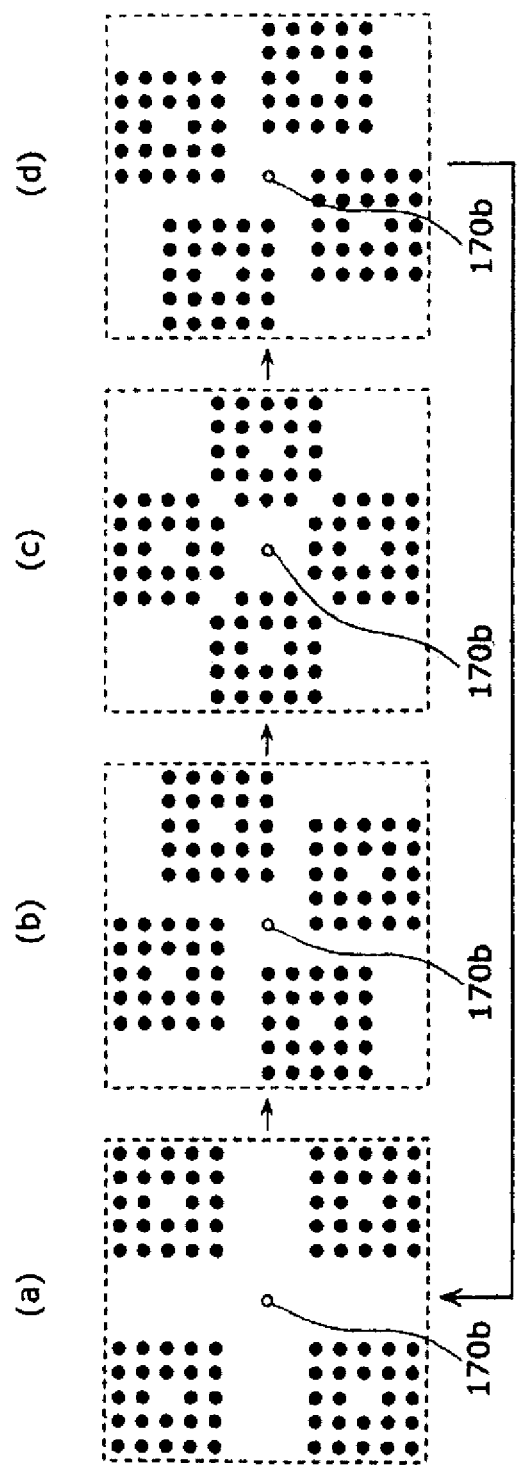

FIG. 15 is a diagram for describing an information presentation device applied to a helmet.

(a) in FIG. 15 is a diagram schematically showing coordinates of a nearby object, assuming that the user is at the center position. Inside a helmet shown in (b) in FIG. 15, the stimulation presentation unit is provided corresponding to the coordinates shown in (a) in FIG. 15. The user who is wearing the helmet can perceive a nearby object through the entire head area.

For example, assuming that the user is moving in the direction (front) indicated by the arrow shown in (a) in FIG. 15, and a nearby object is detected at the back of the user, the stimulation presentation unit provided in a region corresponding to the back of the head of the user provides stimulation inside the helmet shown in (b) in FIG. 15. More specifically, as described in Embodiments 1 and 2, the stimulation control unit causes the stimulation presentation unit to provide stimulation while changing the stimulation region around the reference position.

Furthermore, for example, when a nearby object is detected in front of the user, the stimulation presentation unit provided in a region corresponding to the forehead of the user provides stimulation inside the helmet shown in (b) in FIG. 15. In this case, in a similar manner, the stimulation control unit causes the stimulation presentation unit to provide stimulation while changing the stimulation region around the reference position. Such a helmet can provide support for intuitively understanding states in all directions which are hard to identify through vision. Therefore, as described above, such a helmet is useful for a crew or the like of an airplane, a submarine, and a spaceship.

When the above-described crew or the like is trained to be able to intuitively understand the direction of a nearby object based on the stimulated position, the information presentation device can also be utilized as a direction recognition device which covers omnidirectional, 360 degrees without a blind spot that cannot be supplemented by visual information.

Furthermore, the information presentation device may be realized not only as helmets but also as gloves or suits, which cover bodies, including the stimulation presentation units. When coordinates, from the center portion to a portion where stimulation is provided, are defined as a direction, the information presentation device can also be used as the direction recognition device which covers omnidirectional, 360 degrees.

Furthermore, the following is also included in the present invention.

(1) Specifically, each device described above may be achieved by a computer system which includes a microprocessor, a ROM, a RAM, a hard disk unit, a display unit, a keyboard, a mouse, or the like. A computer program is stored in the RAM or the hard disk unit. The operation of the microprocessor in accordance with the computer program allows each device to achieve its functionality. Here, the computer program is configured of a plurality of pieced together instruction codes indicating a command to the computer in order to achieve a given function.

(2) A portion or all of the structural elements of each of the preceding devices may be configured from one system LSI (Large Scale Integration). A system LSI is a super-multifunction LSI manufactured with a plurality of components integrated on a single chip, and is specifically a computer system configured of a microprocessor, ROM, and RAM, for example. A computer program is stored in the ROM. The system LSI achieves its function through the load of the computer program from the ROM to the RAM by the microprocessor and the operation of the microprocessor in accordance with the computer program.

(3) The structural elements included in the above devices may be partly or wholly realized by an IC card or a single module that is removably connectable to the devices. The IC card or the module is a computer system that includes a microprocessor, a ROM, and a RAM, for example. The IC card or the module may include the super-multifunction LSI described above. Functions of the IC card or the module can be achieved by the microprocessor operating in accordance with the computer program. The IC card or the module may be tamperproof.

(4) The present invention may be a method shown above. In addition, these methods may also be a computer program realizing these methods with a computer, or a digital signal of the computer program.

Moreover, the present invention may also be realized as the computer program or the digital signal stored on a computer-readable storage medium, such as a flexible disk, hard disk, CD-ROM, MO, DVD, DVD-ROM, DVD-RAM, DVD-RAM, BD (Blu-ray (Blu-ray is a registered trademark) Disc), or a semiconductor memory. The present invention may also be realized by the digital signal stored on the above mentioned storage media.

Moreover, the present invention may also be realized by transmitting the computer program or the digital signal, for example, via an electric communication line, a wireless or wired line, a network, such as the Internet, or data broadcasting.

Moreover, the present invention may also be a computer system that includes a microprocessor and a memory. In this case, the computer program may be stored in the memory, with the microprocessor operating in accordance with the computer program.

Moreover, the computer program or the digital signal may be implemented by an independent computer system by being stored on the storage media and transmitted, or sent via the network or the like.

(5) The preceding embodiments and the preceding modifications may be combined.

Note that, the present invention is not limited to the embodiments or the modifications thereof. Various modifications to the above-described embodiments and modifications thereof or forms constructed by combining structural elements of different embodiments or modifications thereof that may be conceived by a person of ordinary skill in the art which do not depart from the essence of the present invention are intended to be within the scope of the present invention.

INDUSTRIAL APPLICABILITY

The present invention makes it possible for a user to clearly perceive a feature of the nearby object, in particular the position of the nearby object, through a tactile sensation. In particular, the present invention is useful as an information presentation device which is provided on a driving seat or a steering wheel of an automobile and presents position information of the nearby object.

REFERENCE SIGNS LIST 100, 300 Information presentation device
110 Obtainment unit
120 Stimulation control unit
130, 230, 330 Stimulation presentation unit
140, 190b, 290b, 390b, 391b Contact surface
150, 150a to 150d, 170b, 180b, 350, 370b, 380b Projectable stimulation unit
160, 260, 360 Moving object
170, 180, 270, 280, 370, 380 Nearby object
170a, 180a, 270a, 270a', 280a, 280a', 370a, 370a', 380a, 380a' Position
190a, 290a, 390a, 391a Range of detection
240, 270b, 280b Rotatable stimulation unit
250 Protrusion
310 Contact surface detection unit
340 Entire surface

The invention claimed is:

1. An information presentation device which provides a user with stimulation corresponding to a feature of a nearby object around the user, the information presentation device comprising:
    an obtainment unit configured to obtain information indicating the feature of the nearby object;
    a stimulation presentation unit which contacts the user through a contact surface and is configured to provide the user with the stimulation in a stimulation region within the contact surface; and
    a stimulation control unit configured to (i) determine, based on the information indicating the feature of the nearby object, a reference position, which is a position within the contact surface, indicating a positional relationship between the user and the nearby object, and (ii) perform control for causing the stimulation presentation unit to provide the stimulation while changing the stimulation region with reference to the reference position irrelevant to a direction of the nearby object,
    wherein the changing of the stimulation region increases stimulation to be provided to the user by changing a position to which stimulation is provided,
    the stimulation control unit is configured to perform the control for causing the stimulation presentation unit to provide the stimulation while changing the stimulation region with reference to the reference position irrelevant to a direction and a position of the nearby object, and
    the stimulation region is changed without providing an indication that alerts the user to the direction and the position of the nearby object.

2. The information presentation device according to claim 1,
    wherein the information indicating the feature of the nearby object is information indicating a position of the nearby object or information indicating a relative position between the user and the nearby object.

3. The information presentation device according to claim 1,
    wherein the stimulation control unit is configured to perform control for causing the stimulation presentation unit to provide the stimulation while moving a position of the stimulation region around the reference position.

4. The information presentation device according to claim 1,
    wherein the stimulation control unit is configured to perform control for causing the stimulation presentation unit to provide stimulation while increasing or decreasing an area of the stimulation region around the reference position.

5. The information presentation device according to claim 1,
    wherein the stimulation presentation unit (i) includes a plurality of projectable stimulation units which are provided on the contact surface and each of which is capable of projecting from the contact surface, and (ii) is configured to provide the user with the stimulation by the projection of the projectable stimulation units in the stimulation region.

6. The information presentation device according to claim 1,
    wherein the stimulation presentation unit includes a plurality of rotatable stimulation units which are provided on the contact surface and each of which rotates on the contact surface, and
    the stimulation control unit is configured to identify the rotatable stimulation unit which corresponds to the reference position and perform control for causing the rotatable stimulation unit to rotate.

7. The information presentation device according to claim 1, further comprising
    a contact surface detection unit configured to detect the contact surface.

8. The information presentation device according to claim 1,
    wherein the stimulation control unit is configured to (i) calculate a degree of danger based on the information indicating the feature of the nearby object and (ii) cause the stimulation presentation unit to provide stimulation while changing the stimulation region based on the degree of danger.

9. The information presentation device according to claim 2,
    wherein the stimulation control unit is configured to perform control for causing the stimulation presentation unit to provide stimulation while changing the stimulation region more quickly when the distance between a position of the user and a position of the nearby object is shorter.

10. The information presentation device according to claim 2,
    wherein the stimulation control unit is configured to perform control for causing the stimulation presentation unit to provide stimulation while changing the stimulation region more quickly when a position of the nearby object changes to a greater degree.

11. The information presentation device according to claim 1,
wherein the stimulation control unit is further configured to cause a change in stimulus strength based on the information indicating the feature of the nearby object.

12. A method for controlling an information presentation device which contacts a user through a contact surface and provides, in a stimulation region within the contact surface, stimulation corresponding to a feature of a nearby object around the user, the method comprising:
obtaining information indicating the feature of the nearby object;
determining, based on the information indicating the feature of the nearby object, a reference position, which is a position within the contact surface, indicating a positional relationship between the user and the nearby object; and
providing the user with stimulation while changing the stimulation region with reference to the reference position irrelevant to a direction of the nearby object,
wherein the changing of the stimulation region increases stimulation to be provided to the user by changing a position to which stimulation is provided,
the providing the user with stimulation provides the stimulation while changing the stimulation region with reference to the reference position irrelevant to a direction and a position of the nearby object, and
the stimulation region is changed without providing an indication that alerts the user to the direction and the position of the nearby object.

13. The information presentation device according to claim 1,
wherein the positional relationship indicated by the reference position includes a distance between the user and the nearby object.

14. The information presentation device according to claim 1,
wherein the contact surface corresponds to a predetermined range around the user and the nearby object when viewed from above, and
the reference position with respect to entirety of the contact surface corresponds to a position of the nearby object with respect to entirety of the predetermined range.

15. The information presentation device according to claim 1,
wherein the obtainment unit is configured to obtain information indicating a position of the nearby object, information indicating the position of the nearby object including information indicating a distance between the user and the nearby object, and
the stimulation control unit is configured to:
determine a reference position, which is a position within the contact surface, indicating a positional relationship between the user and the nearby object based on the information indicating the position of the nearby object, the reference position changing according to the distance between the user and the nearby object; and
perform control for causing the stimulation presentation unit to provide the stimulation while changing the stimulation region irrelevant to a direction of the nearby object with reference to the reference position.

* * * * *

UNITED STATES PATENT AND TRADEMARK OFFICE
CERTIFICATE OF CORRECTION

PATENT NO.        : 9,463,740 B2
APPLICATION NO.   : 14/117645
DATED             : October 11, 2016
INVENTOR(S)       : Ishigami et al.

It is certified that error appears in the above-identified patent and that said Letters Patent is hereby corrected as shown below:

Please delete Patent 9,463,740 B2 in its entirety and insert Patent 9,463,740 B2 in its entirety as shown on the attached pages Signed and Sealed this
Third Day of January, 2017

Michelle K. Lee
*Director of the United States Patent and Trademark Office*

(12) United States Patent
Ishigami et al.

(10) Patent No.: US 9,463,740 B2
(45) Date of Patent: Oct. 11, 2016

(54) INFORMATION PRESENTATION DEVICE, AND METHOD FOR CONTROLLING INFORMATION PRESENTATION DEVICE

(71) Applicant: Panasonic Corporation, Osaka (JP)

(72) Inventors: Tomohide Ishigami, Osaka (JP); Toshiya Arai, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 104 days.

(21) Appl. No.: 14/117,645

(22) PCT Filed: Apr. 18, 2013

(86) PCT No.: PCT/JP2013/002632
§ 371 (c)(1),
(2) Date: Nov. 14, 2013

(87) PCT Pub. No.: WO2013/186973
PCT Pub. Date: Dec. 19, 2013

(65) Prior Publication Data
US 2015/0145659 A1 May 28, 2015

(30) Foreign Application Priority Data
Jun. 11, 2012 (JP) ................. 2012-132220

(51) Int. Cl.
*B60Q 1/00* (2006.01)
*B60Q 9/00* (2006.01)
(Continued)

(52) U.S. Cl.
CPC ............. *B60Q 9/008* (2013.01); *B60R 16/02* (2013.01); *B62D 15/029* (2013.01);
(Continued)

(58) Field of Classification Search
None
See application file for complete search history.

(56) References Cited

U.S. PATENT DOCUMENTS 8,412,390 B2 4/2013 Sanma et al.
2005/0258977 A1* 11/2005 Kiefer et al. ............ 340/903
(Continued)

FOREIGN PATENT DOCUMENTS

JP 2005-088717 4/2005
JP 2005-280436 10/2005
(Continued)

OTHER PUBLICATIONS

International Search Report issued Jun. 4, 2013 in International (PCT) Application No. PCT/JP2013/002632.

*Primary Examiner* — Travis Hunnings
(74) *Attorney, Agent, or Firm* — Wenderoth, Lind & Ponack, L.L.P.

(57) ABSTRACT

An information presentation device includes: an obtainment unit which obtains position information indicating a position of a nearby object with respect to a user; a stimulation presentation unit which contacts the user through a contact surface and provides stimulation in a stimulation region within the contact surface; and a stimulation control unit which (i) determines a reference position, which is a position within the contact surface, corresponding to the position information and (ii) performs control for causing the stimulation presentation unit to provide the user with stimulation while changing the stimulation region with reference to the reference position.

15 Claims, 15 Drawing Sheets

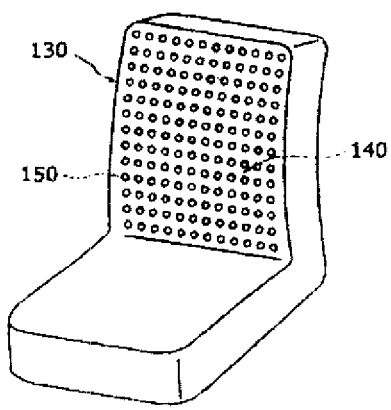

US 9,463,740 B2
Page 2

(51) Int. Cl.
*B60R 16/02* (2006.01)
*B62D 15/02* (2006.01)
*G08G 1/16* (2006.01)
*G08B 6/00* (2006.01)
*B60N 2/44* (2006.01)

(52) U.S. Cl.
CPC ........ *B60N 2002/4485* (2013.01); *G08B 6/00* (2013.01); *G08G 1/167* (2013.01)

(56) References Cited

U.S. PATENT DOCUMENTS

| | | | |
|---|---|---|---|
| 2006/0255920 A1* | 11/2006 | Maeda et al. | 340/407.1 |
| 2007/0109104 A1* | 5/2007 | Altan et al. | 340/407.1 |
| 2007/0182527 A1* | 8/2007 | Traylor | B60Q 9/008 340/435 |
| 2009/0015045 A1* | 1/2009 | Nathan et al. | 297/217.3 |
| 2010/0260382 A1* | 10/2010 | Burtch | B60T 7/22 382/106 |
| 2011/0001616 A1* | 1/2011 | Nathan et al. | 340/438 |
| 2011/0035100 A1* | 2/2011 | Sanma et al. | 701/36 |
| 2011/0163862 A1* | 7/2011 | Nath | G08G 1/164 340/432 |
| 2012/0126965 A1* | 5/2012 | Sanma et al. | 340/438 |
| 2012/0293314 A1* | 11/2012 | Chatterjee et al. | 340/436 |
| 2014/0118130 A1* | 5/2014 | Chang et al. | 340/435 |

FOREIGN PATENT DOCUMENTS

| | | |
|---|---|---|
| JP | 2006-199094 | 8/2006 |
| JP | 2006-215900 | 8/2006 |
| JP | 2006-341839 | 12/2006 |
| JP | 2008-077631 | 4/2008 |
| JP | 2011-37305 | 2/2011 |
| JP | 2011-048566 | 3/2011 |
| JP | 4650720 | 3/2011 |

\* cited by examiner

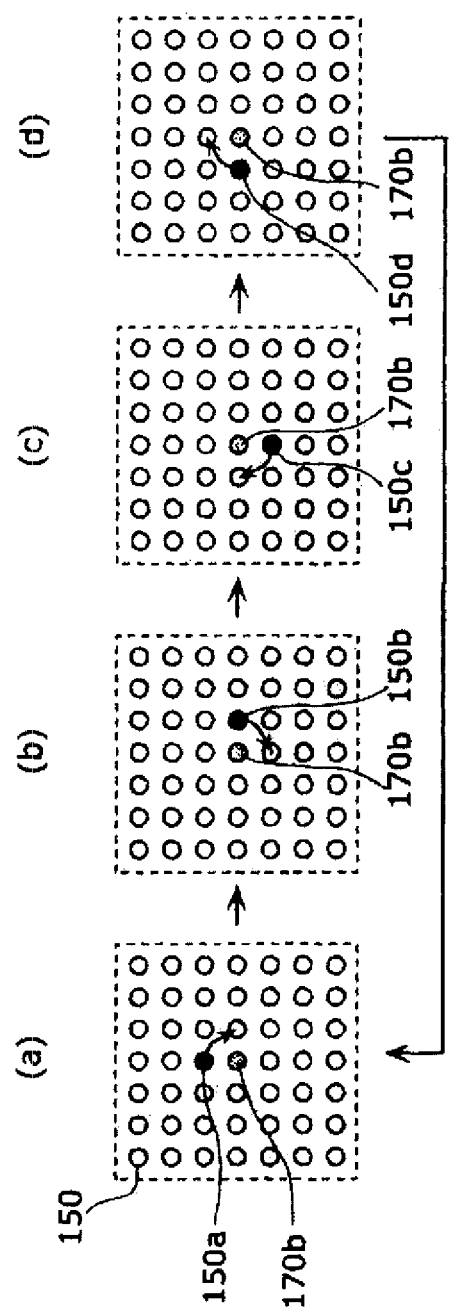

INFORMATION PRESENTATION DEVICE, AND METHOD FOR CONTROLLING INFORMATION PRESENTATION DEVICE

TECHNICAL FIELD

The present invention relates to an information presentation device which presents information to a user by providing stimulation perceived through a tactile sensation.

BACKGROUND ART

Conventionally, techniques are available which allow a user to perceive a position of a nearby object using a device (hereinafter also referred to as a tactile sensation display) which provides a user with stimulation through a tactile sensation. The tactile sensation display is provided, for example, on a seat or a steering wheel of an automobile to indicate the user a position of a nearby object which is outside the line of sight (e.g., see patent literature (PTL) 1, 2, and 3).

CITATION LIST

Patent Literature

[PTL 1]
Japanese Unexamined Patent Application Publication No. 2006-199094
[PTL 2]
Japanese Patent No. 4650720
[PTL 3]
Japanese Unexamined Patent Application Publication No. 2011-37305

SUMMARY OF INVENTION

Technical Problem

However, with techniques in PTL 1, 2, and 3, stimulation provided to a user to indicate a position of a nearby object is generally weak. In particular, a user has difficulty in clearly perceiving the position of a nearby object when a change in position of the nearby object with respect to the user is small.

Solution to Problem

In order to solve the above problems, an information presentation device according to an aspect of the present invention is an information presentation device which provides a user with stimulation corresponding to a feature of a nearby object around the user, the information presentation device including: an obtainment unit configured to obtain information indicating the feature of the nearby object; a stimulation presentation unit which contacts the user through a contact surface and is configured to provide the user with the stimulation in a stimulation region within the contact surface; and a stimulation control unit configured to (i) determine, based on the information indicating the feature of the nearby object, a reference position within the contact surface, and (ii) perform control for causing the stimulation presentation unit to provide the stimulation while changing the stimulation region with reference to the reference position.

It should be note that these general and specific aspects may be implemented using a system, a method, an integrated circuit, a computer program, a computer-readable recording medium, such as a CD-ROM, or any combination of systems, methods, integrated circuits, computer programs and recording media.

Advantageous Effects of Invention

An information presentation device according to the present invention makes it possible for a user to clearly perceive a feature of a nearby object, in particular the position of the nearby object, through a tactile sensation, even when a change in position of the nearby object with respect to the user is small.

BRIEF DESCRIPTION OF DRAWINGS

FIG. 1 is a block diagram showing a system configuration of an information presentation device according to Embodiment 1.

FIG. 2 is a schematic diagram showing a specific configuration of a stimulation presentation unit according to Embodiment 1.

FIG. 3 is a diagram for describing operations performed by the information presentation device according to Embodiment 1.

FIG. 4 is a flowchart of operations performed by the information presentation device according to Embodiment 1.

FIG. 5 is a diagram showing an example of a method of controlling used by a stimulation control unit to provide stimulation.

FIG. 6 is a diagram showing a first modification of a method of controlling used by the stimulation control unit to provide stimulation.

FIG. 7 is a diagram showing a second modification of a method of controlling used by the stimulation control unit to provide stimulation.

FIG. 8 shows a configuration of a rotatable stimulation unit.

FIG. 9 is a diagram for describing operations performed by an information presentation device which uses a rotatable stimulation unit.

FIG. 10 is a block diagram showing a system configuration of an information presentation device according to Embodiment 2.

FIG. 11 is a diagram for describing operations performed by a stimulation presentation unit according to Embodiment 2.

FIG. 12 is a flowchart of operations performed by the information presentation device according to Embodiment 2.

FIG. 13 is a diagram showing a method of providing stimulation by the stimulation control unit according to Embodiment 2.

FIG. 14 is a diagram showing another example of the method of providing stimulation by the stimulation control unit according to Embodiment 2.

FIG. 15 is a diagram for describing an information presentation device applied to a helmet.

DESCRIPTION OF EMBODIMENTS

Underlying Knowledge Forming Basis of the Present Invention

As described in the "Background Art", a technique is anticipated which makes it possible for a user to clearly perceive the position of a nearby object even when a change in position of the nearby object with respect to the user is small.

For example, a technique according to PTL 1 provides a steering wheel of an automobile with a plurality of tactile sensation devices for providing stimulation to a user, by turning on or off adjacent tactile sensation devices corresponding to the position of a nearby object. With the technique according to PTL 1, the stimulation given to a user is sometimes weak, depending on the position of a hand of a user gripping the steering wheel.

Furthermore, a technique according to PTL 2 arranges vibrators in a grid on a seating surface and back of a seat of an automobile to provide a user with vibration through a vibrator on the seat which corresponds to the position of a nearby object. When a change in position of the nearby object with respect to a user is small, the user perceives stimulation from the same position. This decreases the sensitivity of the user to stimulation, sometimes causing the cases in which the user cannot feel sufficient stimulation.

Furthermore, a technique described in PTL 3 controls the stimulus strength of two vibrators provided on a steering wheel of an automobile, and thereby providing a user, who is gripping a portion between the two vibrators on the steering wheel, with stimulation corresponding to the position of a nearby object. The technique in PTL 3 has a problem that the stimulation provided to a user is weak because the user grips a portion between the vibrators.

In order to solve the above problems, an information presentation device according to an aspect of the present invention is an information presentation device which provides a user with stimulation corresponding to a feature of a nearby object around the user, the information presentation device including: an obtainment unit configured to obtain information indicating the feature of the nearby object; a stimulation presentation unit which contacts the user through a contact surface and is configured to provide the user with the stimulation in a stimulation region within the contact surface; and a stimulation control unit configured to (i) determine, based on the information indicating the feature of the nearby object, a reference position within the contact surface, and (ii) perform control for causing the stimulation presentation unit to provide the stimulation while changing the stimulation region with reference to the reference position.

In this manner, when the stimulation region in which stimulation is given to the user is changed around the position which corresponds to the nearby object, it is possible to provide user with strong stimulation based on the feature of the nearby object.

Furthermore, for example, the information indicating the feature of the nearby object may be information indicating a position of the nearby object or information indicating a relative position between the user and the nearby object.

More specifically, with respect to certain position information, when the stimulation is provided while changing the stimulation region with reference to the reference position, it is possible to provide the user with strong stimulation irrespective of a change in position of the nearby object. Thus, the user can clearly perceive the position of the nearby object.

Furthermore, for example, the stimulation control unit may be configured to perform control for causing the stimulation presentation unit to provide the stimulation while moving a position of the stimulation region around the reference position.

Furthermore, for example, the stimulation control unit may be configured to perform control for causing the stimulation presentation unit to provide stimulation while increasing or decreasing an area of the stimulation region around the reference position.

Furthermore, for example, it may be that the stimulation presentation unit (i) includes a plurality of projectable stimulation units which are provided on the contact surface and each of which is capable of projecting from the contact surface, and (ii) is configured to provide the user with the stimulation by the projection of the projectable stimulation units in the stimulation region.

Furthermore, for example, it may be that the stimulation presentation unit includes a plurality of rotatable stimulation units which are provided on the contact surface and each of which rotates on the contact surface, and the stimulation control unit is configured to identify the rotatable stimulation unit which corresponds to the reference position and perform control for causing the rotatable stimulation unit to rotate.

Furthermore, for example, the information presentation device may further include a contact surface detection unit configured to detect the contact surface.

Furthermore, for example, it may be that the stimulation control unit is configured to (i) calculate a degree of danger based on the information indicating the feature of the nearby object and (ii) cause the stimulation presentation unit to provide stimulation while changing the stimulation region based on the degree of danger.

Furthermore, for example, the stimulation control unit may be configured to perform control for causing the stimulation presentation unit to provide stimulation while changing the stimulation region more quickly when the distance between a position of the user and a position of the nearby object is shorter.

With this, the user can perceive the distance between the position of the moving object and the position of the nearby object with the rate of change of the stimulation region.

Furthermore, for example, the stimulation control unit may be configured to perform control for causing the stimulation presentation unit to provide stimulation while changing the stimulation region more quickly when a position of the nearby object changes to a greater degree.

With this, the user can perceive a change in position of the nearby object (speed of the nearby object) with the rate of change of the stimulation region.

Furthermore, for example, the stimulation control unit may be further configured to cause a change in stimulus strength based on the information indicating the feature of the nearby object.

Furthermore, for example, the stimulation control unit (i) determines a first reference position within the contact surface based on information indicating the feature of the nearby object and performs control for causing the stimulation presentation unit to provide stimulation while changing over time the stimulation region with reference to the first reference position, and (ii) subsequently, when determining within the contact surface a second reference position different from the first reference position based on the information indicating the feature of the nearby object, performs control for causing the stimulation presentation unit to provide stimulation while changing over time the stimulation region with reference to the second reference position.

In the case of the above, for example, when two automobiles are present around the user, the stimulation control unit may assign the position of the first automobile to a first reference position, assign a second automobile to a second reference position, and perform control to cause stimulation to be provided while causing the respective stimulation regions to be independently changed over time.

Furthermore, a method for controlling an information presentation device according to an aspect of the present invention is a method for controlling an information presentation device which contacts a user through a contact surface and provides, in a stimulation region within the contact surface, stimulation corresponding to a feature of a nearby object around the user, the method including: obtaining information indicating the feature of the nearby object; determining, based on the information indicating the feature of the nearby object, a reference position within the contact surface; and providing the user with stimulation while changing the stimulation region with reference to the reference position.

The following describes embodiments of the present invention, with reference to drawings. Each of the embodiments describes an example in which the information presentation device according to the present invention is applied to an automobile and a user who drives the automobile.

Note that, the embodiments below are specific examples of the present invention. Numerical values, structural elements, the arrangement and connection configuration of the structural elements, steps, the sequence of the steps, and so on, described in the embodiments below are merely examples and are not intended to limit the present invention. Furthermore, among the structural elements in the following embodiments, those structural elements which are not described in the independent claims indicating the broadest concept of the present invention are described as arbitrary structural elements.

Embodiment 1

FIG. 1 is a block diagram showing a system configuration of an information presentation device according to Embodiment 1.

An information presentation device 100 includes an obtainment unit 110, a stimulation control unit 120, and a stimulation presentation unit 130. The information presentation device 100 provides user, who is traveling by an automobile (moving object), stimulation corresponding to the position of a nearby object.

The obtainment unit 110 obtains position information indicating the position of a nearby object with respect to the moving object. Typically, the position information of the nearby object is information on distance, which is detected by a millimeter-wave radar provided outside the information presentation device 100, between the moving object and the nearby object. More specifically, the obtainment unit 110 obtains position information from the millimeter-wave radar provided outside the information presentation device 100. Note that, the obtainment unit 110 may obtain position information from a device which uses a stereo camera, a time-of-flight (TOF) distance sensor, a range finder, a global positioning system (GPS), or the like. The obtainment unit 110 may obtain position information via a wired or a wireless link.

The stimulation presentation unit 130 contacts a user through a contact surface, and provides, in a stimulation region within the contact surface, the user with stimulation. In Embodiment 1, the stimulation presentation unit 130 is provided on a driving seat in an automobile, and the contact surface is a backrest of the driving seat. The stimulation presentation unit 130 will be described in detail later.

The stimulation control unit 120 determines a reference position, which is a position within the contact surface, corresponding to position information, and performs control to change a stimulation region with reference to the reference position in providing a user with stimulation. More specifically, in Embodiment 1, the stimulation control unit 120 performs control to cause the stimulation region to move around the reference position, to provide a user with stimulation.

Next, a specific configuration of the stimulation presentation unit 130 is described.

FIG. 2 is a schematic diagram showing a specific configuration of the stimulation presentation unit 130 according to Embodiment 1.

As described above, in Embodiment 1, the stimulation presentation unit 130 is provided on the driving seat of an automobile, and a contact surface 140 is the backrest of the driving seat which contacts the back of a user. The contact surface 140 includes a plurality of projectable stimulation units 150 arranged in a matrix. Each of the projectable stimulation units 150 projects toward a user from the contact surface 140 only when stimulation is provided to the user, and does not projects from the contact surface 140 under normal conditions. Note that, the number of the projectable stimulation units 150 shown in FIG. 2 is merely an example, and is not necessarily accurately drawn. The same applies to the following drawings.

Whether the projectable stimulation unit 150 is projected or not projected is controlled by a piezoelectric element (piezoelectric actuator) which is provided to each of the projectable stimulation units 150. More specifically, the stimulation control unit 120 controls the projection of the projectable stimulation units 150 by controlling a voltage applied to the piezoelectric element provided to each of the projectable stimulation units 150.

Note that, whether the projectable stimulation unit 150 is projected or not projected may be controlled by a solenoid coil. The control is also possible by a gel actuator or a small actuator, such as a stacked-type electrostatic actuator.

Next, operations performed by the information presentation device 100 are described.

FIG. 3 is a diagram for describing operations performed by the information presentation device 100.

In FIG. 3, (a) is a schematic diagram showing, from above, a positional relationship between a moving object driven by a user and nearby objects, and (b) is a cross-sectional view which shows the stimulation presentation unit 130 from behind the driving seat.

FIG. 4 is a flowchart showing operations performed by the information presentation device 100.

First, the obtainment unit 110 obtains position information of a nearby object within a range of detection 190a of the millimeter-wave radar (S101 in FIG. 4). More specifically, as shown in (a) in FIG. 3, the obtainment unit 110 obtains information on a position 170a of a nearby object 170 and information on a position 180a of a nearby object 180 with respect to a moving object 160 driven by a user. Note that, in (a) in FIG. 3, the upside is the direction in which the moving object 160 is traveling. Although (a) in FIG. 3 is a schematic diagram in which the nearby objects are assumed to be automobiles, the nearby objects may be a building, a pedestrian, or the like as a matter of course.

Next, the stimulation control unit 120 determines a reference position (S102 in FIG. 4). The reference position is a position, which is a position within the contact surface, corresponding to position information of the nearby object. More specifically, as shown in (b) in FIG. 3, the stimulation control unit 120 determines, in a contact surface 190b corresponding to the range of detection 190a, a projectable stimulation unit 170b corresponding to the position 170a and a projectable stimulation unit 180b corresponding to the position 180a as reference positions. Note that, the reference position need not necessarily be the projectable stimulation unit 150, and a portion which is within the contact surface 190b and does not include the projectable stimulation unit 150 may be determined as the reference position.

For example, the stimulation control unit 120 can determine, as the reference position, the projectable stimulation unit 170b positioned closest to the position corresponding to the position 170a in the contact surface 190b based on a relative relationship between the range of detection 190a and the contact surface 190b.

Note that, in an example shown in FIG. 3, the center of the contact surface 190b corresponds to the position of the moving object 160. However, the position corresponding to the moving object 160 in the contact surface 190b may be set at any position.

Lastly, the stimulation control unit 120 performs control for causing the projectable stimulation units 150, which are included in the contact surface 190b and used to provide the user with stimulation, to project in sequence, and thus allows the stimulation presentation unit 130 to provide stimulation (S103 in FIG. 4). More specifically, for example, the stimulation control unit 120 performs control to cause the projectable stimulation units 150 to project in a clockwise sequence around the reference position when seen from the user side. In other words, a stimulation region (the projectable stimulation unit 150 which is projected) in the contact surface 190b which provides the user with stimulation moves around the reference position (take turns) on the contact surface 190b.

FIG. 5 is a diagram showing an example of a method of controlling used by a stimulation control unit 120 to provide stimulation.

FIG. 5 is, different from (b) in FIG. 3, a diagram showing, from the user side, the contact surface 190b near the projectable stimulation unit 170b in (b) in FIG. 3. In the figure, each of the projectable stimulation units 150 indicated by a white circle represents the projectable stimulation unit which is not projected from the contact surface 190b. Furthermore, projectable stimulation units 150a, 150b, 150c, and 150d indicated by black circles represent the projectable stimulation units which are projected from the contact surface 190b. The projectable stimulation unit 170b is a projectable stimulation unit which is determined as the reference position by the stimulation control unit 120. Note that, although FIG. 5 only shows near the projectable stimulation unit 170b in the contact surface 190b, the same applies to near the projectable stimulation unit 180b.

As shown in FIG. 5, the stimulation control unit 120 controls the projection of the projectable stimulation unit 150 to cause the projected projectable stimulation unit (i.e., the stimulation region) to move around the projectable stimulation unit 170b, when seen from the user side.

More specifically, subsequent to the state in (a) in FIG. 5 in which only the projectable stimulation unit 150a is projected, the stimulation control unit 120 causes only the projectable stimulation unit 150b to be projected. Subsequent to the state in (b) in FIG. 5 in which only the projectable stimulation unit 150b is projected, the stimulation control unit 120 causes only the projectable stimulation unit 150c to be projected as shown in (c) in FIG. 5, and subsequently, causes only the projectable stimulation unit 150d to be projected as shown in (d) in FIG. 5. Subsequent to the state shown in (d) in FIG. 5 in which only the projectable stimulation unit 150d is projected, the stimulation control unit 120 causes only the projectable stimulation unit 150a to be projected as shown in (a) in FIG. 5, and the control is iterative thereafter.

Note that, when the position relationship between the moving object 160 and the nearby object 170 is changed, the stimulation control unit 120 determines, as the reference position, the projectable stimulation unit 150 different from the projectable stimulation unit 170b, and performs a similar control with the determined projectable stimulation unit 150 as the center.

In this manner, the stimulation control unit 120 controls the projection of the projectable stimulation unit 150 to cause the projected projectable stimulation unit 150 to move around the projectable stimulation unit 170b. With this, the user can perceive rotating-like stimulation around the reference position. In other words, even when the position of the nearby object 170 does not change, and thus there is no change in the projectable stimulation unit 150 which is the reference position, stimulation can be provided to the user. Thus, stronger stimulation can be provided compared to the conventional technique.

When stimulation is kept applied to a same position, the sensitivity to perceive the stimulation decreases. Usually, the stimulation applied to a user is approximately obtained according to Expression (1) below.

$$\text{stimulation} = \text{amount of change in area of the stimulation region per unit time} \times \text{magnitude of stimulation} \times \text{sensation coefficient of a receptive field} \quad \text{(Expression 1)}$$

In Expression (1), the sensation coefficient of the receptive field is a parameter which depends on space resolution of the stimulation region and frequency response of the receptive field of skin through which a user perceives stimulation.

As shown in Expression (1), stimulation applied to a user is greater with the presentation method in which the position of stimulation (stimulation region) is changed than with a presentation method in which a position of stimulation is not changed but the magnitude is changed. Stated differently, the sensitivity of a user to perceive stimulation increases. Thus, in this manner, the information presentation device 100 constantly changes the stimulation region, and thus it is possible to provide a user with stimulation (information) without causing a decrease in the sensitivity of a user to perceive stimulation.

Note that, the method of providing stimulation by the stimulation control unit 120 shown in FIG. 5 is an example, and the method is not limited to this example. The stimulation control unit 120 may provide a user with stimulation while changing the stimulation region with reference to the reference position.

Each of FIG. 6 and FIG. 7 is a diagram showing another example of a method of controlling used by the stimulation control unit 120 to provide stimulation. Note that, illustration of the projectable stimulation units 150 which are not projected is omitted in FIG. 6 and FIG. 7.

As shown in (a) to (d) in FIG. 6, the stimulation control unit 120 may control the projection of the projectable stimulation units 150 to cause each of four stimulation blocks, which form a stimulation region, to move around the reference position. In an example shown in FIG. 6, each of the stimulation blocks includes 24 projected projectable stimulation units.

Furthermore, as shown in (a) to (d) in FIG. 7, the number of stimulation blocks and the number of projected projectable stimulation units included in the stimulation block need not be constant while the stimulation is provided.

As shown in FIG. 7, the number of stimulation blocks, and the projected projectable stimulation units included in the stimulation block need not necessarily be constant during the rotation.

Note that, it is preferable that a change in stimulation region be adjusted corresponding to the receptive field of the skin of the user which contacts the contact surface 140. With this, the sensation coefficient of the receptive field in Expression (1) above can be optimized.

Note that, although Embodiment 1 describes that the projectable stimulation units 150 are arranged on the contact surface 140 to form a matrix, the projectable stimulation units 150 may be arranged on the contact surface 140 to form a honeycomb shape. Furthermore, the projectable stimulation units 150 may be provided on the seating surface of the driving seat as a matter of course.

Note that, the contact surface 140 of the stimulation presentation unit 130 may include a plurality of electrodes arranged in a matrix in place of the projectable stimulation units 150. More specifically, the stimulation control unit 120 may provide a user with stimulation by applying a weak current from the electrode.

Furthermore, the contact surface 140 may include a plurality of air holes arranged in a matrix in place of the projectable stimulation units 150. More specifically, the stimulation control unit 120 may provide a user with stimulation using air pressure through air holes provided on the stimulation presentation unit 130.

In a similar manner, the stimulation control unit 120 may provide a user with stimulation not only by directly sending air to a user, but also by pushing out or retracting a projection, such as a balloon, using air pressure.

As described, the stimulation presentation unit 130 is not limited to a configuration using the projectable stimulation units 150. For example, the stimulation presentation unit 130 may include a plurality of rotatable stimulation units.

FIG. 8 shows a configuration of a rotatable stimulation unit. In FIG. 8, (a) is a diagram showing the rotatable stimulation unit from a side, and (b) is a diagram showing the rotatable stimulation unit from above.

As shown in FIG. 8, a rotatable stimulation unit 240 includes four protrusions 250. The rotatable stimulation units 240 are arranged to form a matrix on the contact surface 140 of a stimulation presentation unit 230, as with the projectable stimulation units 150. Each of the rotatable stimulation units 240 rotates with respect to the contact surface 140.

FIG. 9 is a diagram for describing operations performed by an information presentation device using the rotatable stimulation unit 240. Note that, the flowchart of operations is the same as the flowchart in FIG. 4.

First, the obtainment unit 110 obtains position information of a nearby object within a range of detection 290a of the millimeter-wave radar (S101 in FIG. 4). More specifically, as shown in (a) in FIG. 9, the obtainment unit 110 obtains information on a position 270a of a nearby object 270 and information on a position 280a of a nearby object 280 with respect to a moving object 260.

Next, the stimulation control unit 120 determines the reference position within the contact surface (S102 in FIG. 4). More specifically, as shown in (b) in FIG. 9, in a contact surface 290b corresponding to the range of detection 290a, the stimulation control unit 120 determines as reference positions (i) a rotatable stimulation unit 270b which is closest to a position 270a' corresponding to the position 270a and (ii) a rotatable stimulation unit 280b which is closest to a position 280a' corresponding to the position 280a.

Lastly, the stimulation control unit 120 causes the rotatable stimulation units 270b and 280b to rotate to allow the stimulation presentation unit 130 to provide stimulation (S103 in FIG. 4).

In this manner, a configuration in which the rotatable stimulation units 240 including a plurality of the protrusions 250 are arranged in a matrix is advantageous in that, compared to a configuration using the projectable stimulation units 150, it is possible to reduce a control resource, simplify the control, and reduce a device size of the stimulation control unit 120.

Furthermore, in the stimulation presentation unit 230 using the rotatable stimulation unit 240, the rotation speed of the rotatable stimulation unit may be changed corresponding to the speed of movement of a nearby object. More specifically, the stimulation control unit 120 may increase the rotation speed of the rotatable stimulation unit 240 more when the position of the nearby object changes to a greater degree. Furthermore, the size of the nearby object may be measured with the millimeter-wave radar or the like, and the stimulation control unit 120 may increase the rotation speed of the rotatable stimulation unit 240 more as the size of the nearby object increases.

The above-described movement speed or size of the nearby object may be used as a parameter indicating a degree of danger. Thus, the stimulation control unit 120 can make a user aware of a degree of danger by increasing stimulation provided to the user, that is, by increasing the speed of rotation speed as the degree of danger increases.

Note that, the information presentation device 100 may include a unit for estimating degree-of-danger and may determine the degree of danger based on other than the movement speed or size of the nearby object. For example, when the moving object is equipped with a drive recorder or a camera, such as a back monitor, the unit for estimating degree-of-danger can detect a person by a contour or a histogram of an edge (gradient direction of brightness) with image processing and image recognition input from a camera. When a person is detected by the unit for estimating degree-of-danger, the stimulation control unit 120 may determine that the degree of danger is high and increase the rotation speed of the rotatable stimulation unit 240.

Moreover, the unit for estimating degree-of-danger may detect not only a person but a type of an automobile through learning using a similar scheme, and differentiate a heavy vehicle, such as a truck or a bus, a general vehicle, and others to determine the degree of danger. At this time, for example, in the case where a heavy vehicle is detected, the degree of danger may be increased considering the risk at the time of collision, and the stimulation control unit 120 may increase the speed of rotation of the rotatable stimulation unit 240 to be greater than a rotation speed of the rotatable stimulation unit 240 of the case in which a general vehicle is detected.

Moreover, the unit for estimating degree-of-danger may, when used with the image processing and image recognition, perform the above-described detection not only based on the contour or the histogram of the edge (the gradient direction of brightness) but also based on an amount of feature, such as an optical flow or a local autocorrelation.

Furthermore, in the future, when intelligent transportation systems (ITS) for automobiles further advance and an era comes in which short-distance communication is performed among automobiles, it is assumed that a type of a nearby vehicle can be determined based on the result of the short-distance communication. Furthermore, it is also assumed that a pedestrian or the like also gives out position information in a short range to be safe, resulting in an easier detection of a pedestrian in a short range.

In this case, the unit for estimating degree-of-danger may recognize the degree of danger by detecting information on vehicles or pedestrians via the short-distance communication. For example, when an existence of a heavy vehicle or a pedestrian is detected in a predetermined distance, the stimulation control unit 120 increases a rotation speed of the rotatable stimulation unit 240, allowing a user to recognize the degree of danger.

Furthermore, through the short-distance communication, it is also possible to obtain driving state of a nearby vehicle (e.g., how fast a vehicle is traveling, how much a steering wheel is rotated, or the like). Thus, the unit for estimating degree-of-danger may recognize the degree of danger based not only on a type of a vehicle or a presence of a pedestrian but also based on the driving state of the nearby vehicle.

Note that, the information obtained by the obtainment unit 110 is not limited to the position information. For example, the obtainment unit 110 may obtain information indicating a feature of a nearby object via a wired or a wireless link. The information indicating the feature of the nearby object may be, for example, the position information. The information may also be information indicating the speeds, the directions, the sizes, the types of the moving object (the user) and the nearby object. When the information obtained by the obtainment unit 110 is the speeds of the user and the nearby object, configuration in which the reference position within the contact surface represents the speed is conceivable.

For example, when it is assumed that the center position within the contact surface of the stimulation presentation unit 130 is the speed of the user, the stimulation control unit 120 may set, the faster the speed of the nearby object is compared to the speed of the user, the reference position at an upper side relative to the center position, and the slower the speed of the nearby object is compared to the speed of the moving object (the user), the reference position at a lower side relative to the center position.

When the obtainment unit 110 obtains information on the type of the nearby object, whether the type of the nearby object is a person or an automobile is recognized, for example. In this case, a camera or the like which is capable of image recognition may be provided outside the information presentation device 100 (e.g., in a moving object).

When the obtainment unit 110 obtains information indicating the type of the nearby object, the stimulation control unit 120 may set the reference position at upper side relative to the center position when the type of the nearby object is a person, and set the reference position at a lower side relative to the center position when the nearby object is an automobile. More specifically, when the obtainment unit 110 obtains information indicating the feature of the nearby object, the stimulation control unit 120 may determine the reference position based on information which shows the feature, and performs control to cause the stimulation presentation unit to provide stimulation while changing the stimulation region with reference to the reference position.

Note that, the stimulation control unit 120 may control a vehicle operation unit, such as a steering wheel or a brake, based on position information obtained by the obtainment unit 110. More specifically, the stimulation control unit 120 may perform control, based on the position information, to apply a load (resistance is applied to the steering wheel operation) for an operation of a steering wheel in a direction where a nearby object is present. Furthermore, for example, based on position information, the stimulation control unit 120 may perform control to slow down or stop the automobile through a brake operation when a nearby object is present in the front.

Note that, the stimulation presentation unit 130 using the projectable stimulation units 150 may change the rate of change of the stimulation region corresponding to the movement speed of a nearby object or a size of a nearby object. Furthermore, a control is conceivable in which, in providing a user with stimulation, the stimulation region is changed more quickly when the distance between the position of the moving object (the user) and the position of the nearby object is shorter.

Moreover, the stimulation control unit 120 may change the rate of change of the stimulation region corresponding to the degree of danger, and may further change the area of the stimulation region.

The information presentation device 100 according to Embodiment 1 has been thus far described. With the information presentation device 100, a user can clearly perceive through a tactile sensation the position of a nearby object even when the change in position of the nearby object with respect to the user is small.

Embodiment 2

Embodiment 1 described an information presentation device 100 which is applied to a driving seat of an automobile. Embodiment 2 describes an example of an information presentation device which is applied to a steering wheel of an automobile. Note that, in the following description of Embodiment 2, structural elements having the same reference signs as structural elements in Embodiment 1 operate in a similar manner and have similar functions as the corresponding structural elements in Embodiment 1, and the descriptions thereof are omitted.

FIG. 10 is a block diagram showing a system configuration of an information presentation device according to Embodiment 2.

An information presentation device 300 is different from the information presentation device 100 in that the information presentation device 300 includes a contact surface detection unit 310. Furthermore, as described later, the information presentation device 300 is also different from the information presentation device 100 in that a stimulation presentation unit 330 is provided on a steering wheel of an automobile.

Although the information presentation device 300 is applied to the steering wheel, the position where a user grips the steering wheel is different depending on a user who drives an automobile. Thus, when a reference position is determined with respect to the entire surface of the steering wheel, there is a possibility that stimulation is not appropriately provided to a user when the reference position and the position at which the steering wheel is gripped are significantly different.

In view of this, the information presentation device 300 includes the contact surface detection unit 310, and the contact surface detection unit 310 detects a contact surface that is a region of the steering wheel where the user is gripping with respect to the entire surface of the steering wheel. More specifically, the contact surface detection unit 310 is, for example, a pressure sensor, and detects the contact surface based on the pressure applied by the user by gripping the steering wheel.

Next, the stimulation presentation unit 330 is described with reference to (b) in FIG. 11.

(b) in FIG. 11 is a diagram for describing operations performed by the stimulation presentation unit 330.

An entire surface 340 of the steering wheel is the stimulation presentation unit 330 and includes a plurality of the projectable stimulation unit 350. The projectable stimulation unit 350 has a similar configuration as a projectable stimulation unit 150 described in Embodiment 1.

Next, operations performed by the information presentation device 300 are described with reference to the above-described (b) in FIG. 11, (a) in FIG. 11, and FIG. 12.

(a) in FIG. 11 is a schematic diagram showing, from above, positional relationship between the moving object driven by a user and the nearby objects.

FIG. 12 is a flow chart of operations performed by the information presentation device 300.

First, the obtainment unit 110 obtains position information of the nearby objects which are in the left in a range of detection 390a and in the right in a range of detection 391a relative to the moving direction of a moving object 360 (S201 in FIG. 12). More specifically, as shown in (a) in FIG. 11, the obtainment unit 110 obtains information on a position 370a of a nearby object 370 and information on a position 380a of a nearby object 380 with respect to the moving object 360.

Next, the contact surface detection unit 310 detects the contact surface (S202 in FIG. 12). More specifically, the contact surface detection unit 310 detects, with a pressure sensor, a contact surface 390b and a contact surface 391b that are the regions gripped by the user with respect to the entire surface 340 of the steering wheel.

Next, the stimulation control unit 120 determines the reference position within the contact surface (S203 in FIG. 12). More specifically, as shown in (b) in FIG. 11, in the contact surface 390b corresponding to the range of detection 390a, the stimulation control unit 120 determines as the reference position a projectable stimulation unit 380b in a position 380a' corresponding to the position 380a.

Furthermore, in the contact surface 391b corresponding to the range of detection 391a, the stimulation control unit 120 determines as the reference position a projectable stimulation unit 370b in a position 370a' corresponding to the position 370a.

Lastly, the stimulation control unit 120 causes, in the contact surfaces 390b and 391b, the projectable stimulation unit 350 which is used to provide the user with stimulation to be projected, and thus a user is provided with stimulation (S204 in FIG. 12). More specifically, the stimulation control unit 120 performs control to provide the user with stimulation while increasing or decreasing the area of the stimulation region around the reference position.

FIG. 13 is a diagram showing an example of a method of providing stimulation used by the stimulation control unit 120 according to Embodiment 2.

FIG. 13 is a diagram showing the position 370a' in (b) in FIG. 11 from the user side. In the figure, each of the projectable stimulation units 350 indicated by a white circle represents the projectable stimulation unit 350 which is not projected from the contact surface 391b. Furthermore, the projectable stimulation units 350 indicated by black circles represent the projectable stimulation units 350 which are projected from the contact surface 391b. The projectable stimulation unit 370b is the projectable stimulation unit 350 which is determined as the reference position by the stimulation control unit 120. Note that, although FIG. 13 only shows the position 370a', the same applies to the position 380a'.

As shown in FIG. 13, the stimulation control unit 120 controls the projection of the projectable stimulation unit 350 to increase or decrease the projected projectable stimulation units 350 radially around the projectable stimulation unit 370b, when seen from the user side. More specifically, the stimulation control unit 120 controls the projection of the projectable stimulation unit 350 to increase or decrease the area of the stimulation region radially around the projectable stimulation unit 370b.

More specifically, the stimulation control unit 120 causes the stimulation region to change to the states shown in (a), (b), (c), and (d) in FIG. 13 in the stated order, to increase the area of the stimulation region. After the stimulation region achieves the state shown in (d) in FIG. 13, the stimulation control unit 120 causes the stimulation region to achieve a state shown in (a) in FIG. 13. Stated differently, the stimulation control unit 120 decreases the area of the stimulation region. The control is iterative thereafter.

Note that, when the positional relationship between the moving object 360 and the nearby object 370 is changed, the stimulation control unit 120 determines, as the reference position, the projectable stimulation unit 350 different from the projectable stimulation unit 370b, and performs a similar control around the determined projectable stimulation unit 350.

Note that, the method of providing stimulation used by the stimulation control unit 120 is not limited to an example shown in FIG. 13. As with Embodiment 1, the stimulation control unit 120 may control the projection of the projectable stimulation unit 350 to cause the projected projectable stimulation unit 350 to move around the projectable stimulation unit 370b.

Furthermore, the stimulation control unit 120 may cause the projectable stimulation unit 350 to be projected randomly around the projectable stimulation unit 370b.

FIG. 14 is a diagram showing another example of a method of providing stimulation used by the stimulation control unit 120 according to Embodiment 2. As shown in FIG. 14, the stimulation control unit 120 needs not necessarily change the stimulation region periodically, and may change the stimulation region randomly.

Note that, in the information presentation device 100 described in Embodiment 1, the stimulation control unit 120 may cause the stimulation region to be increased or decreased radially or cause the stimulation region to be changed randomly.

The information presentation device 300 according to Embodiment 2 has been thus far described. With the information presentation device 300, a user can clearly perceive through a tactile sensation the position of a nearby object even when the change in position of the nearby object with respect to the user is small.

Note that, when the stimulation presentation unit 330 is provided on the steering wheel as with Embodiment 2, unlike the driving seat, there are cases where it may not be able to provide a sufficient area of contact with the user. In such a case, the position information obtained by the obtainment unit 110 may be simplified and the simplified position may be used as the reference position.

More specifically, the information presentation device 300 may have a configuration which indicates a rough position of a nearby object. For example, even when the information presentation device 300 only informs the user of in which side, left, right, front, or back, the nearby object which is outside the line of sight exists with respect to the automobile the user is driving, it is possible to reduce an accident which occurs due to failure to recognize the nearby vehicle when changing lanes.

Other Embodiments

The above-described embodiments described an example in which the present invention is applied to the driving seat or the steering wheel of an automobile. However, the present invention is not limited to the above-described embodiments. For example, the present invention is applicable to moving objects, such as a submarine, an airplane, or a spaceship.

Furthermore, for example, the information presentation device is applicable to a walking assistance device for a person with impaired vision. In this case, the stimulation presentation unit can be realized in a belt-like form worn on the abdominal region or the back of a user or a cloth-like (jacket-like) form. Stated differently, the present invention can also be realized in a form of an object worn by a user.

FIG. 15 is a diagram for describing an information presentation device applied to a helmet.

(a) in FIG. 15 is a diagram schematically showing coordinates of a nearby object, assuming that the user is at the center position. Inside a helmet shown in (b) in FIG. 15, the stimulation presentation unit is provided corresponding to the coordinates shown in (a) in FIG. 15. The user who is wearing the helmet can perceive a nearby object through the entire head area.

For example, assuming that the user is moving in the direction (front) indicated by the arrow shown in (a) in FIG. 15, and a nearby object is detected at the back of the user, the stimulation presentation unit provided in a region corresponding to the back of the head of the user provides stimulation inside the helmet shown in (b) in FIG. 15. More specifically, as described in Embodiments 1 and 2, the stimulation control unit causes the stimulation presentation unit to provide stimulation while changing the stimulation region around the reference position.

Furthermore, for example, when a nearby object is detected in front of the user, the stimulation presentation unit provided in a region corresponding to the forehead of the user provides stimulation inside the helmet shown in (b) in FIG. 15. In this case, in a similar manner, the stimulation control unit causes the stimulation presentation unit to provide stimulation while changing the stimulation region around the reference position. Such a helmet can provide support for intuitively understanding states in all directions which are hard to identify through vision. Therefore, as described above, such a helmet is useful for a crew or the like of an airplane, a submarine, and a spaceship.

When the above-described crew or the like is trained to be able to intuitively understand the direction of a nearby object based on the stimulated position, the information presentation device can also be utilized as a direction recognition device which covers omnidirectional, 360 degrees without a blind spot that cannot be supplemented by visual information.

Furthermore, the information presentation device may be realized not only as helmets but also as gloves or suits, which cover bodies, including the stimulation presentation units. When coordinates, from the center portion to a portion where stimulation is provided, are defined as a direction, the information presentation device can also be used as the direction recognition device which covers omnidirectional, 360 degrees.

Furthermore, the following is also included in the present invention.

(1) Specifically, each device described above may be achieved by a computer system which includes a microprocessor, a ROM, a RAM, a hard disk unit, a display unit, a keyboard, a mouse, or the like. A computer program is stored in the RAM or the hard disk unit. The operation of the microprocessor in accordance with the computer program allows each device to achieve its functionality. Here, the computer program is configured of a plurality of pieced together instruction codes indicating a command to the computer in order to achieve a given function.

(2) A portion or all of the structural elements of each of the preceding devices may be configured from one system LSI (Large Scale Integration). A system LSI is a super-multifunction LSI manufactured with a plurality of components integrated on a single chip, and is specifically a computer system configured of a microprocessor, ROM, and RAM, for example. A computer program is stored in the ROM. The system LSI achieves its function through the load of the computer program from the ROM to the RAM by the microprocessor and the operation of the microprocessor in accordance with the computer program.

(3) The structural elements included in the above devices may be partly or wholly realized by an IC card or a single module that is removably connectable to the devices. The IC card or the module is a computer system that includes a microprocessor, a ROM, and a RAM, for example. The IC card or the module may include the super-multifunction LSI described above. Functions of the IC card or the module can be achieved by the microprocessor operating in accordance with the computer program. The IC card or the module may be tamperproof.

(4) The present invention may be a method shown above. In addition, these methods may also be a computer program realizing these methods with a computer, or a digital signal of the computer program.

Moreover, the present invention may also be realized as the computer program or the digital signal stored on a computer-readable storage medium, such as a flexible disk, hard disk, CD-ROM, MO, DVD, DVD-ROM, DVD-RAM, DVD-RAM, BD (Blu-ray (Blu-ray is a registered trademark) Disc), or a semiconductor memory. The present invention may also be realized by the digital signal stored on the above mentioned storage media.

Moreover, the present invention may also be realized by transmitting the computer program or the digital signal, for example, via an electric communication line, a wireless or wired line, a network, such as the Internet, or data broadcasting.

Moreover, the present invention may also be a computer system that includes a microprocessor and a memory. In this case, the computer program may be stored in the memory, with the microprocessor operating in accordance with the computer program.

Moreover, the computer program or the digital signal may be implemented by an independent computer system by being stored on the storage media and transmitted, or sent via the network or the like.

(5) The preceding embodiments and the preceding modifications may be combined.

Note that, the present invention is not limited to the embodiments or the modifications thereof. Various modifications to the above-described embodiments and modifications thereof or forms constructed by combining structural elements of different embodiments or modifications thereof that may be conceived by a person of ordinary skill in the art which do not depart from the essence of the present invention are intended to be within the scope of the present invention.

INDUSTRIAL APPLICABILITY

The present invention makes it possible for a user to clearly perceive a feature of the nearby object, in particular the position of the nearby object, through a tactile sensation. In particular, the present invention is useful as an information presentation device which is provided on a driving seat or a steering wheel of an automobile and presents position information of the nearby object.

REFERENCE SIGNS LIST 100, 300 Information presentation device
110 Obtainment unit
120 Stimulation control unit
130, 230, 330 Stimulation presentation unit
140, 190b, 290b, 390b, 391b Contact surface
150, 150a to 150d, 170b, 180b, 350, 370b, 380b Projectable stimulation unit
160, 260, 360 Moving object
170, 180, 270, 280, 370, 380 Nearby object
170a, 180a, 270a, 270a', 280a, 280a', 370a, 370a', 380a, 380a' Position
190a, 290a, 390a, 391a Range of detection
240, 270b, 280b Rotatable stimulation unit
250 Protrusion
310 Contact surface detection unit
340 Entire surface

The invention claimed is:

1. An information presentation device which provides a user with stimulation corresponding to a feature of a nearby object around the user, the information presentation device comprising:
an obtainment unit configured to obtain information indicating the feature of the nearby object;
a stimulation presentation unit which contacts the user through a contact surface and is configured to provide the user with the stimulation in a stimulation region within the contact surface; and
a stimulation control unit configured to (i) determine, based on the information indicating the feature of the nearby object, a reference position, which is a position within the contact surface, indicating a positional relationship between the user and the nearby object, and (ii) perform control for causing the stimulation presentation unit to provide the stimulation while changing the stimulation region with reference to the reference position irrelevant to a direction of the nearby object,
wherein the changing of the stimulation region increases stimulation to be provided to the user by changing a position to which stimulation is provided,
the stimulation control unit is configured to perform the control for causing the stimulation presentation unit to provide the stimulation while changing the stimulation region with reference to the reference position irrelevant to a direction and a position of the nearby object, and
the stimulation region is changed without providing an indication that alerts the user to the direction and the position of the nearby object.

2. The information presentation device according to claim 1,
wherein the information indicating the feature of the nearby object is information indicating a position of the nearby object or information indicating a relative position between the user and the nearby object.

3. The information presentation device according to claim 1,
wherein the stimulation control unit is configured to perform control for causing the stimulation presentation unit to provide the stimulation while moving a position of the stimulation region around the reference position.

4. The information presentation device according to claim 1,
wherein the stimulation control unit is configured to perform control for causing the stimulation presentation unit to provide stimulation while increasing or decreasing an area of the stimulation region around the reference position.

5. The information presentation device according to claim 1,
wherein the stimulation presentation unit (i) includes a plurality of projectable stimulation units which are provided on the contact surface and each of which is capable of projecting from the contact surface, and (ii) is configured to provide the user with the stimulation by the projection of the projectable stimulation units in the stimulation region.

6. The information presentation device according to claim 1,
wherein the stimulation presentation unit includes a plurality of rotatable stimulation units which are provided on the contact surface and each of which rotates on the contact surface, and
the stimulation control unit is configured to identify the rotatable stimulation unit which corresponds to the reference position and perform control for causing the rotatable stimulation unit to rotate.

7. The information presentation device according to claim 1, further comprising
a contact surface detection unit configured to detect the contact surface.

8. The information presentation device according to claim 1,
wherein the stimulation control unit is configured to (i) calculate a degree of danger based on the information indicating the feature of the nearby object and (ii) cause the stimulation presentation unit to provide stimulation while changing the stimulation region based on the degree of danger.

9. The information presentation device according to claim 2,
wherein the stimulation control unit is configured to perform control for causing the stimulation presentation unit to provide stimulation while changing the stimulation region more quickly when the distance between a position of the user and a position of the nearby object is shorter.

10. The information presentation device according to claim 2,
wherein the stimulation control unit is configured to perform control for causing the stimulation presentation unit to provide stimulation while changing the stimulation region more quickly when a position of the nearby object changes to a greater degree.

11. The information presentation device according to claim 1,
wherein the stimulation control unit is further configured to cause a change in stimulus strength based on the information indicating the feature of the nearby object.

12. A method for controlling an information presentation device which contacts a user through a contact surface and provides, in a stimulation region within the contact surface, stimulation corresponding to a feature of a nearby object around the user, the method comprising:
obtaining information indicating the feature of the nearby object;
determining, based on the information indicating the feature of the nearby object, a reference position, which is a position within the contact surface, indicating a positional relationship between the user and the nearby object; and
providing the user with stimulation while changing the stimulation region with reference to the reference position irrelevant to a direction of the nearby object,
wherein the changing of the stimulation region increases stimulation to be provided to the user by changing a position to which stimulation is provided,
the providing the user with stimulation provides the stimulation while changing the stimulation region with reference to the reference position irrelevant to a direction and a position of the nearby object, and
the stimulation region is changed without providing an indication that alerts the user to the direction and the position of the nearby object.

13. The information presentation device according to claim 1,
wherein the positional relationship indicated by the reference position includes a distance between the user and the nearby object.

14. The information presentation device according to claim 1,
wherein the contact surface corresponds to a predetermined range around the user and the nearby object when viewed from above, and
the reference position with respect to entirety of the contact surface corresponds to a position of the nearby object with respect to entirety of the predetermined range.

15. The information presentation device according to claim 1,
wherein the obtainment unit is configured to obtain information indicating a position of the nearby object, information indicating the position of the nearby object including information indicating a distance between the user and the nearby object, and
the stimulation control unit is configured to:
determine a reference position, which is a position within the contact surface, indicating a positional relationship between the user and the nearby object based on the information indicating the position of the nearby object, the reference position changing according to the distance between the user and the nearby object; and
perform control for causing the stimulation presentation unit to provide the stimulation while changing the stimulation region irrelevant to a direction of the nearby object with reference to the reference position.

* * * * *